(12) United States Patent
Itoh

(10) Patent No.: US 6,968,128 B2
(45) Date of Patent: Nov. 22, 2005

(54) ZOOM LENS AND CAMERA HAVING THE SAME

(75) Inventor: Yoshinori Itoh, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/161,832

(22) Filed: Jun. 4, 2002

(65) Prior Publication Data

US 2003/0012567 A1 Jan. 16, 2003

(30) Foreign Application Priority Data

Jun. 8, 2001 (JP) ........................ 2001/174134

(51) Int. Cl.⁷ .................... G03B 5/00; G02B 13/18; G02B 15/14
(52) U.S. Cl. .................. 396/79; 359/691; 359/717; 359/684; 348/240.3
(58) Field of Search ................. 359/684, 717, 359/793, 691; 396/79, 72; 348/240.3

(56) References Cited

U.S. PATENT DOCUMENTS

| | | | |
|---|---|---|---|
| 4,647,160 A | 3/1987 | Ikemori ...................... 350/426 |
| 4,662,723 A | 5/1987 | Imai ........................... 350/426 |
| 4,687,302 A | 8/1987 | Ikemori et al. ............. 350/427 |
| 4,802,747 A | 2/1989 | Horiuchi ..................... 350/427 |
| 4,810,072 A | 3/1989 | Takahashi .................... 350/427 |
| 5,283,693 A | 2/1994 | Kohno et al. ................ 359/691 |
| 5,434,710 A | 7/1995 | Zozawa ....................... 359/689 |
| 5,889,620 A | 3/1999 | Furuta ........................ 359/689 |
| 5,991,091 A | 11/1999 | Hayakawa ................... 359/680 |
| 6,025,961 A * | 2/2000 | Kohno et al. ................ 359/691 |
| 6,078,434 A | 6/2000 | Ori ............................. 359/691 |
| 6,081,389 A | 6/2000 | Takayama et al. .......... 359/680 |
| 6,124,984 A | 9/2000 | Shibayama et al. ......... 359/689 |
| 6,154,322 A | 11/2000 | Nakayama ................... 359/691 |
| 6,172,818 B1 | 1/2001 | Sakamoto .................... 359/689 |
| 6,191,896 B1 | 2/2001 | Itoh ............................. 359/689 |
| 6,229,655 B1 | 5/2001 | Kohno et al. ................ 359/689 |
| 6,308,011 B1 | 10/2001 | Wachi et al. ................. 396/72 |
| 6,417,973 B2 | 7/2002 | Mihara et al. ............... 359/684 |
| 2002/0027721 A1 | 3/2002 | Mihara ........................ 359/686 |
| 2003/0103157 A1 | 6/2003 | Watanabe et al. ........... 348/360 |

FOREIGN PATENT DOCUMENTS

| | | | |
|---|---|---|---|
| JP | 61-221719 | 10/1986 | ........... G02B/15/20 |
| JP | 3-296706 | 12/1991 | ........... G02B/15/16 |
| JP | H07-261083 | 10/1995 | |
| JP | 10-104520 | 4/1998 | ........... G02B/15/20 |
| JP | 09-221058 | 2/1999 | ......... G02B/15/163 |
| JP | 09-236718 | 3/1999 | ........... G02B/15/16 |
| JP | H11-084243 | 3/1999 | |
| JP | H11-287953 | 10/1999 | |
| JP | 10-172570 | 1/2000 | ........... G02B/15/20 |
| JP | 2000-089110 | 3/2000 | |
| JP | 2000-111798 | 4/2000 | |
| JP | 2000-267009 | 9/2000 | |
| JP | 2001-215409 | 8/2001 | |
| JP | 2001-281547 | 10/2001 | |
| JP | 2002-048975 | 2/2002 | |
| JP | 2000/265716 | 3/2002 | ........... G02B/15/20 |
| JP | 2002-090624 | 3/2002 | |
| JP | 2002-058518 | 12/2002 | ........... G02B/15/16 |

OTHER PUBLICATIONS

English Abstract of 2000–267009 (Item A).
English Abstract of 2000–111798 (Item B).

(Continued)

*Primary Examiner*—W. B. Pekey
(74) *Attorney, Agent, or Firm*—Morgan & Finnegan, LLP

(57) ABSTRACT

A zoom lens includes in order from the object side to the image side, a first lens unit of negative optical power and a second lens unit of positive optical power. Zooming is effected by varying the interval between the first lens unit and the second lens unit. The second lens unit has, in order from the object side to the image side, an aspherical positive lens and an aspherical negative lens.

46 Claims, 17 Drawing Sheets

OTHER PUBLICATIONS

English Abstract of 2000–089110 (Item C).
English Abstract of H11–287953 (Item D).
English Abstract of H11–084243 (Item E).
English Abstract of 2002–048975 (Item F).
English Abstract of 2002–090624 (Item G).
English Abstract & Translation of Item H–H07–261083 (translated by JPO resident translator application).
English Abstract & Translation of Item I–2001–215409 (translated by JPO resident translator application).
English Abstract & Translation of Item J–2001–281547 (translaed by JPO resident translator application).
Copy of Notification of Reason for Refusal for counterpart Japanese Patent Application No. 2001–174134, dated Sep. 17, 2004.
Translation of Notification of Reason for Refusal for counterpart Japanese Patent Application No. 2001–174134 (Item KK).
EPO Search Report issued Feb. 17, 2004 for counterpart application EP 02253975.
English Abstract for Japanese Application No. JP 09–236718.
English Abstract for Japanese Application No. JP 09–221058.
English Abstract for Japanese Application No JP 2002–058518.
English Abstract for Japanese Application No. JP 10–172570.
English Abstract for Japanese Application No. JP 2000–265716.
English language translation of Japanese Patent Office Notification of Reason for Refusal in Priority Japanese Application No. 2001–174134.

* cited by examiner

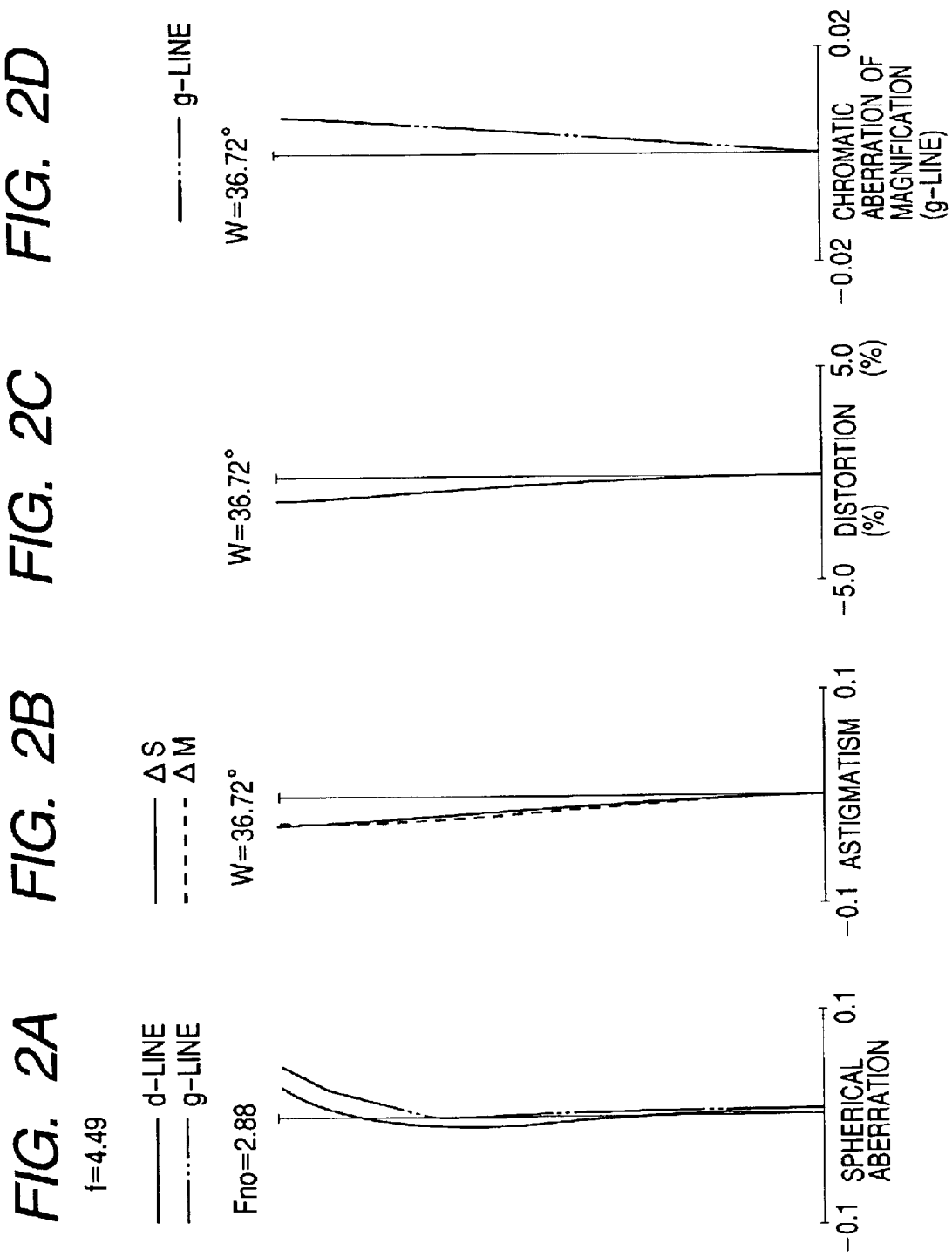

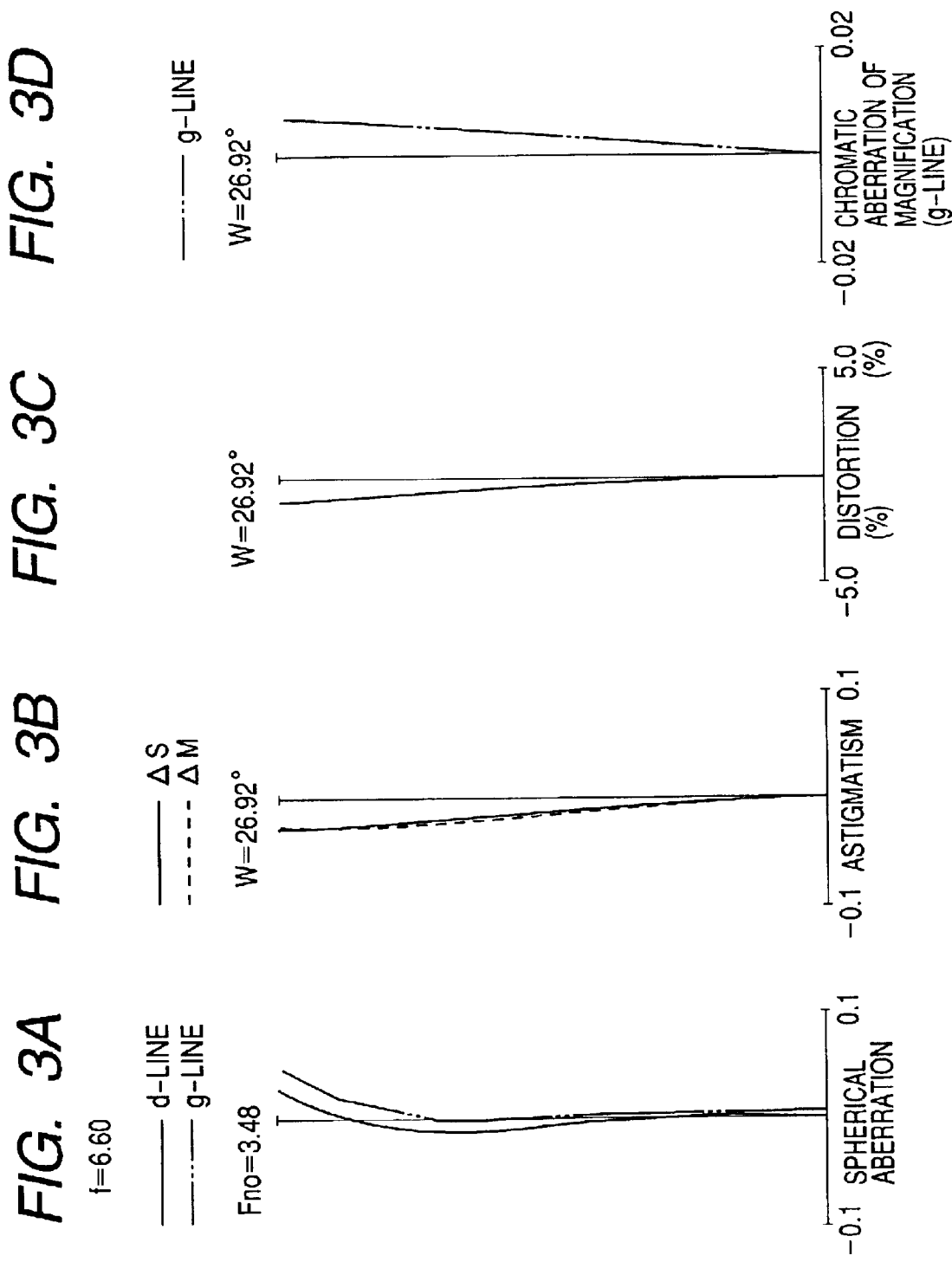

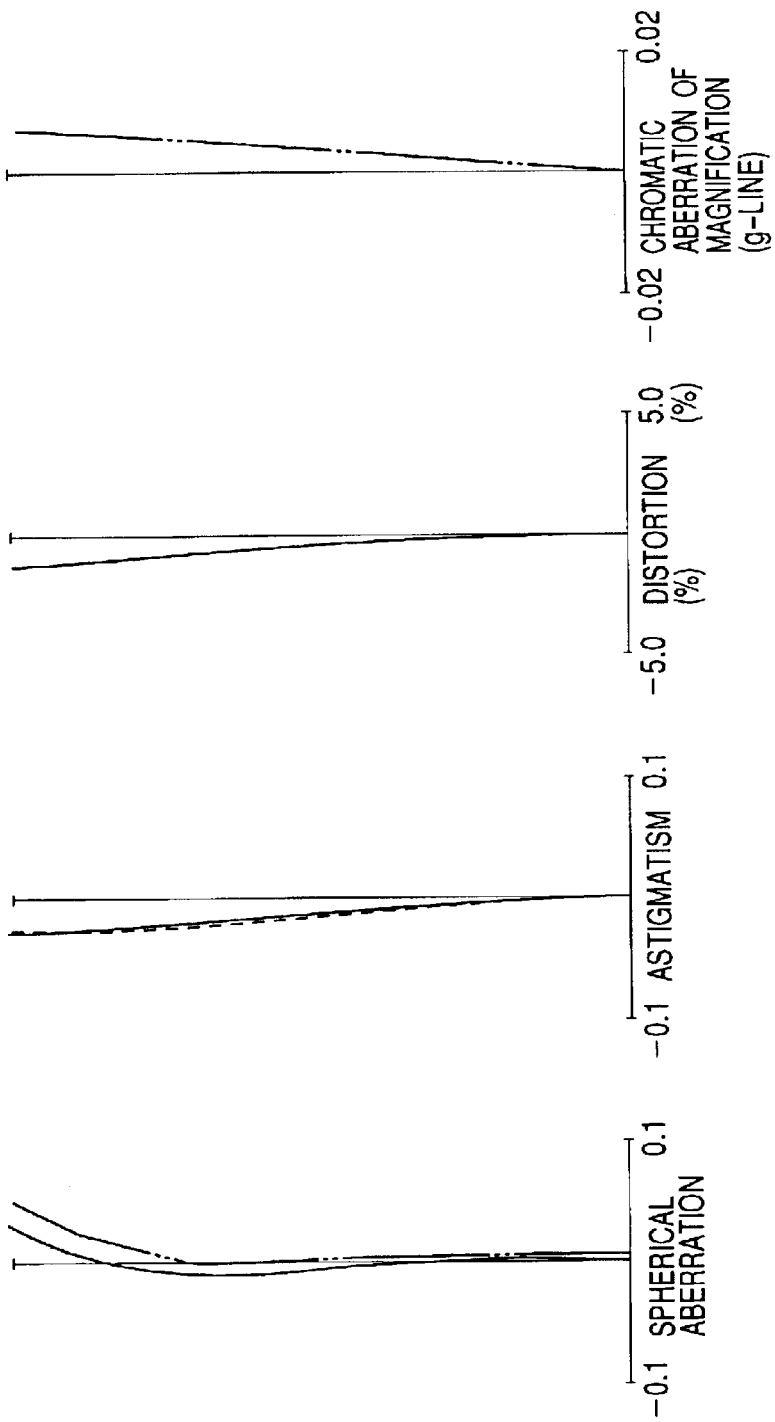

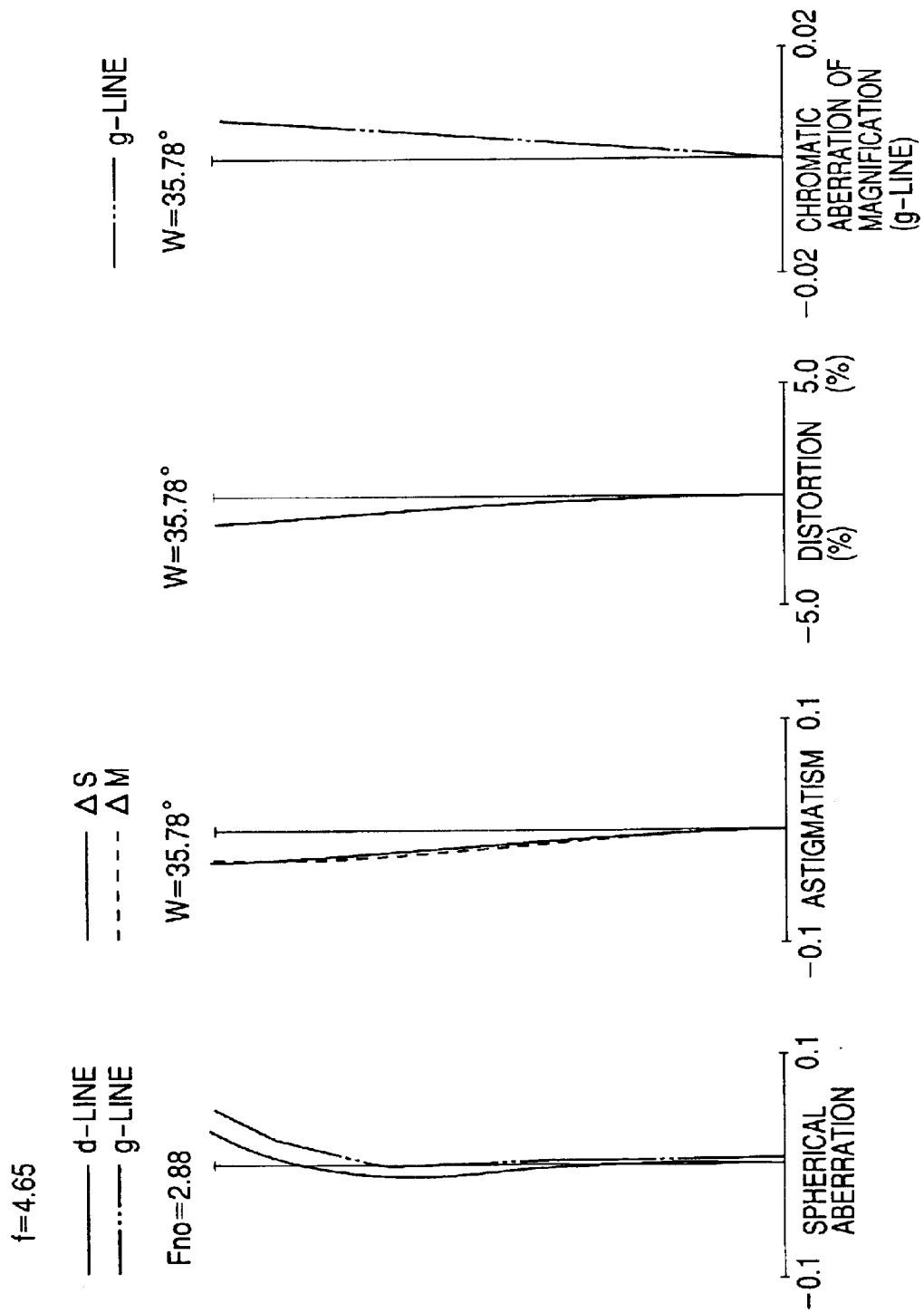

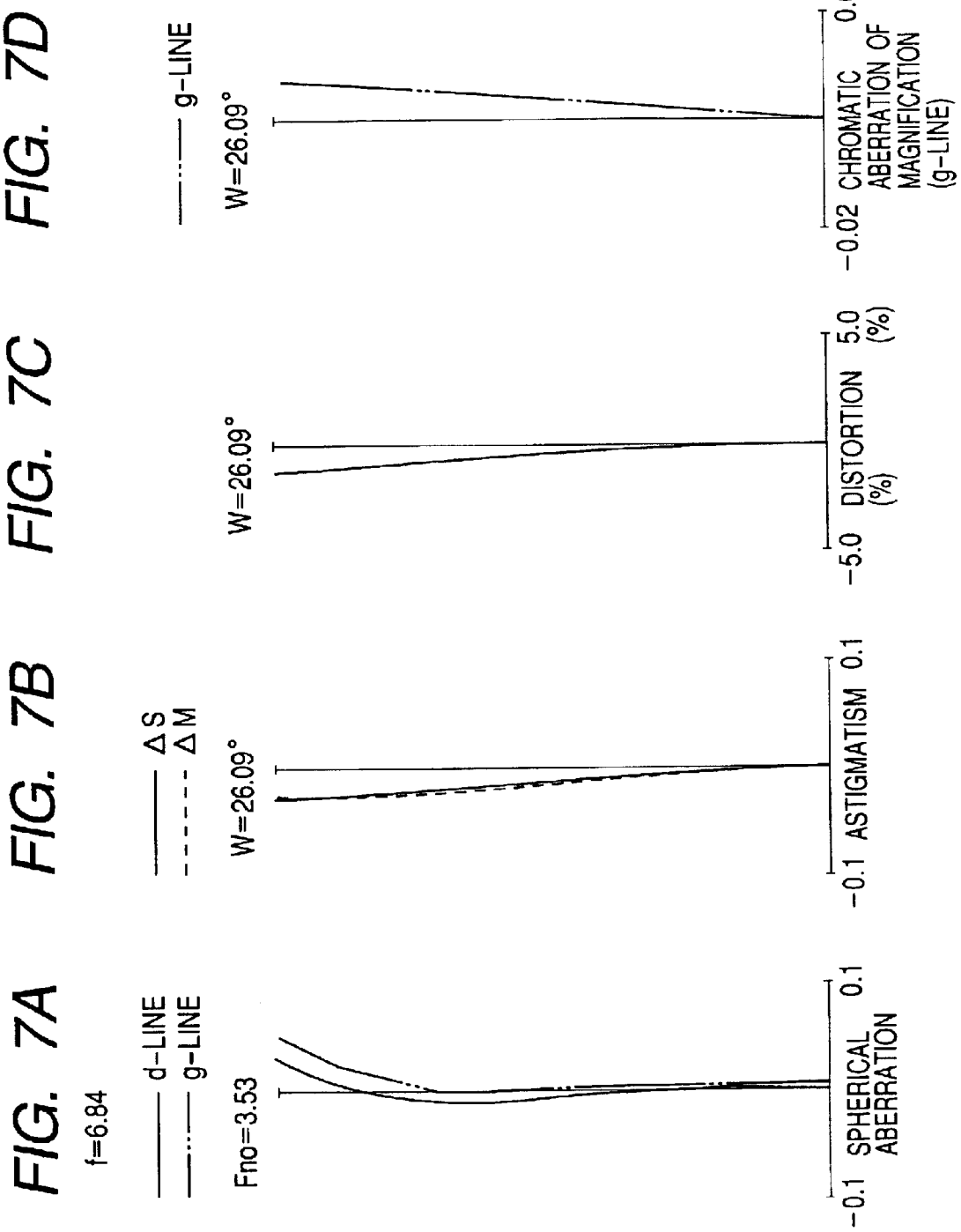

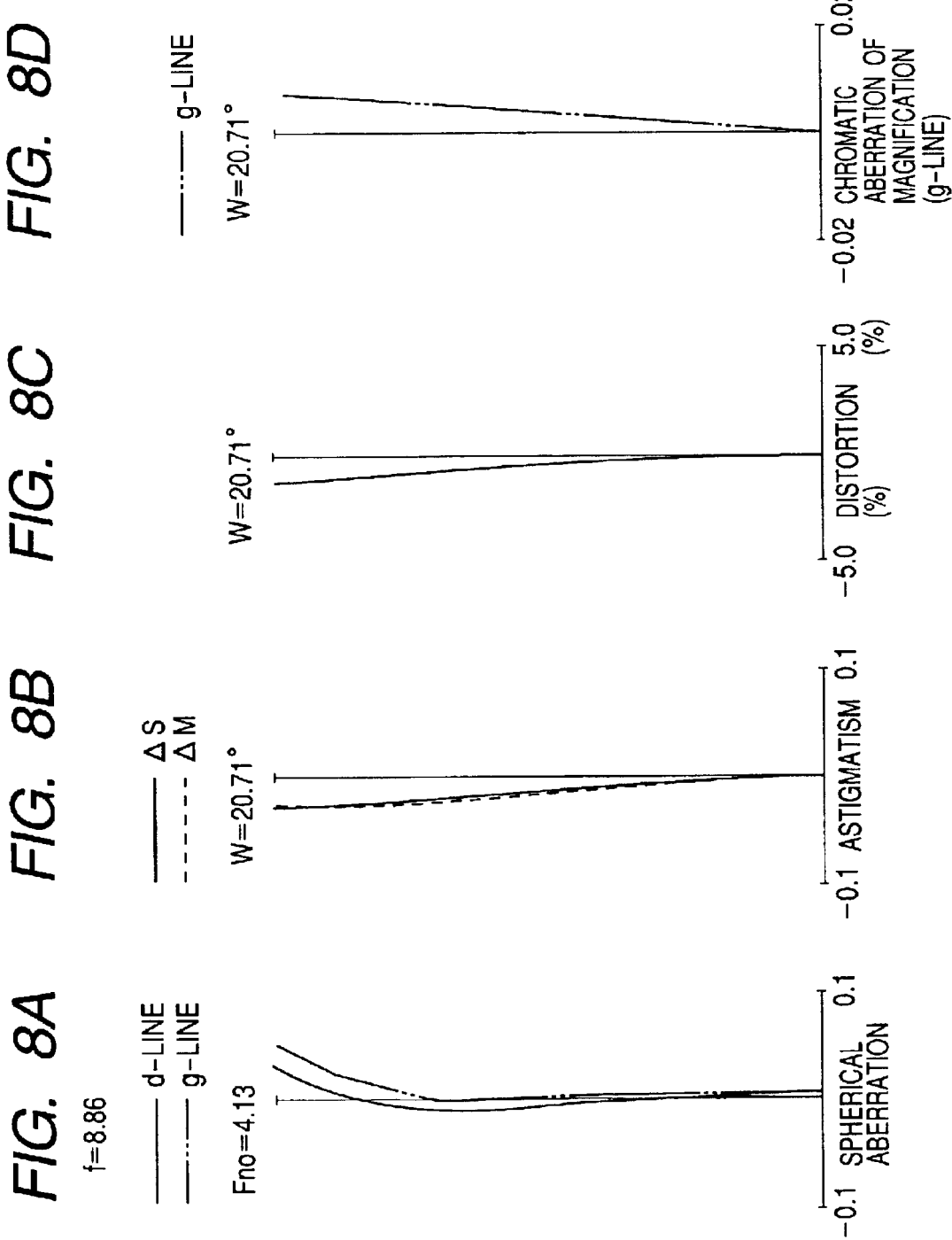

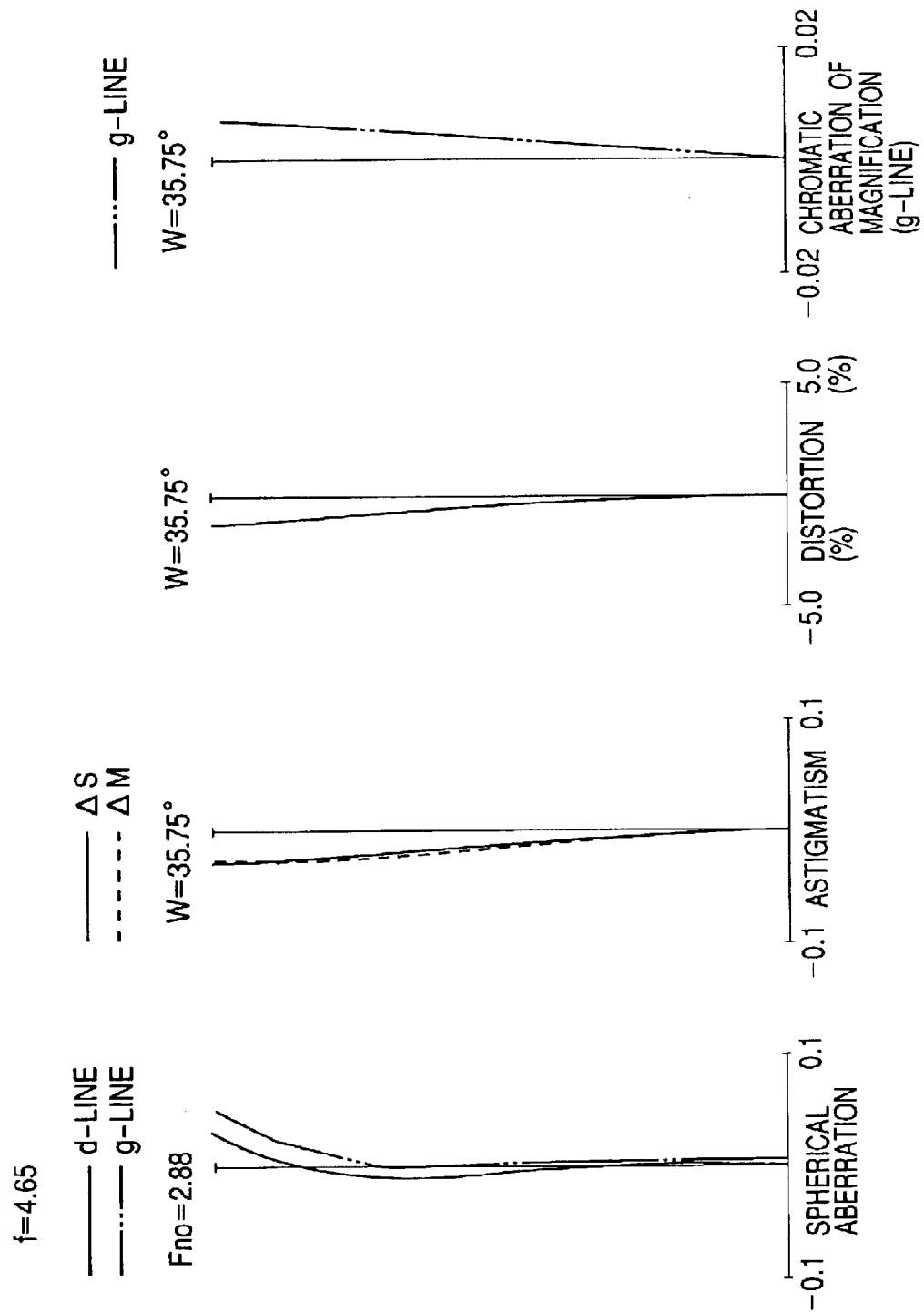

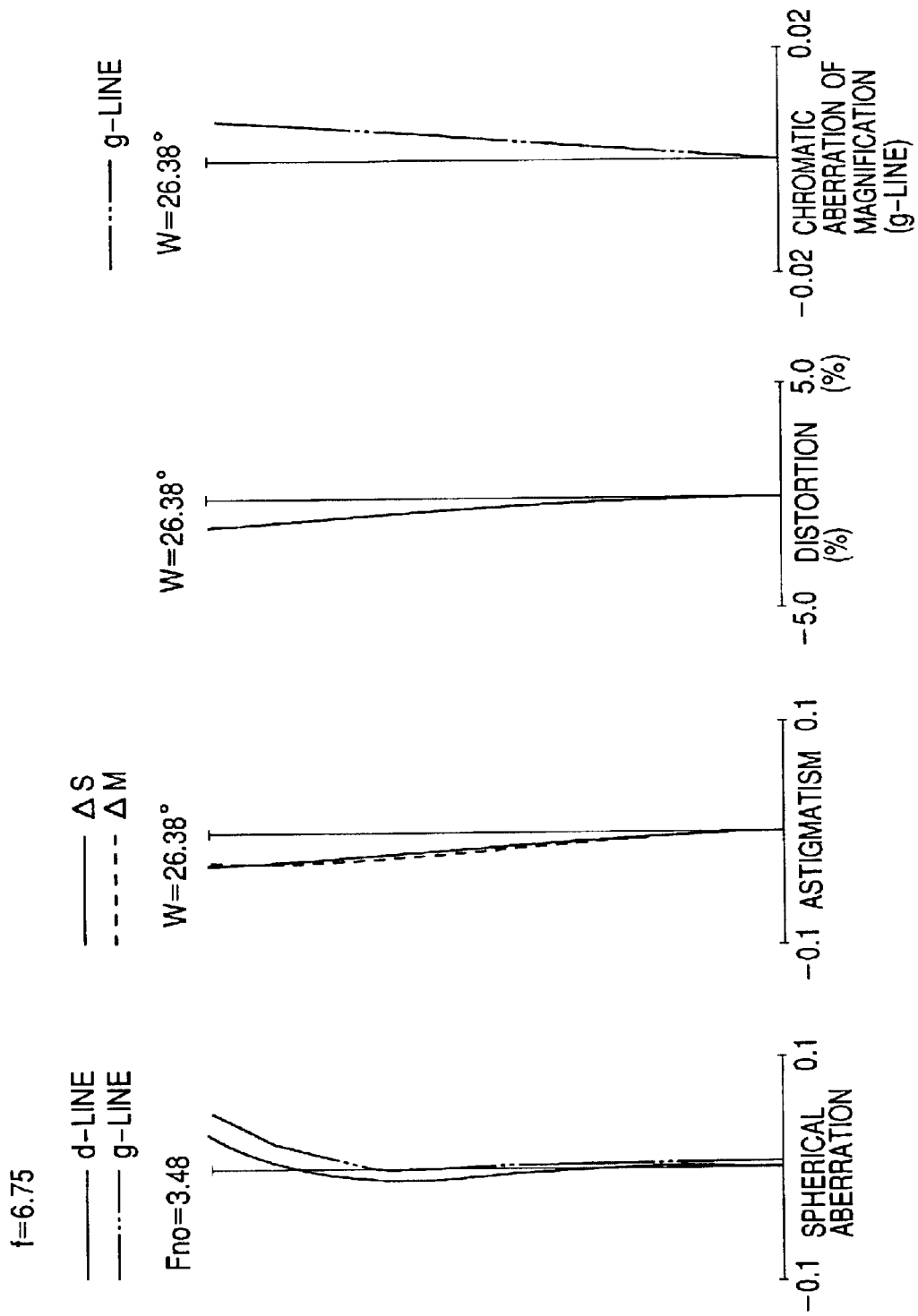

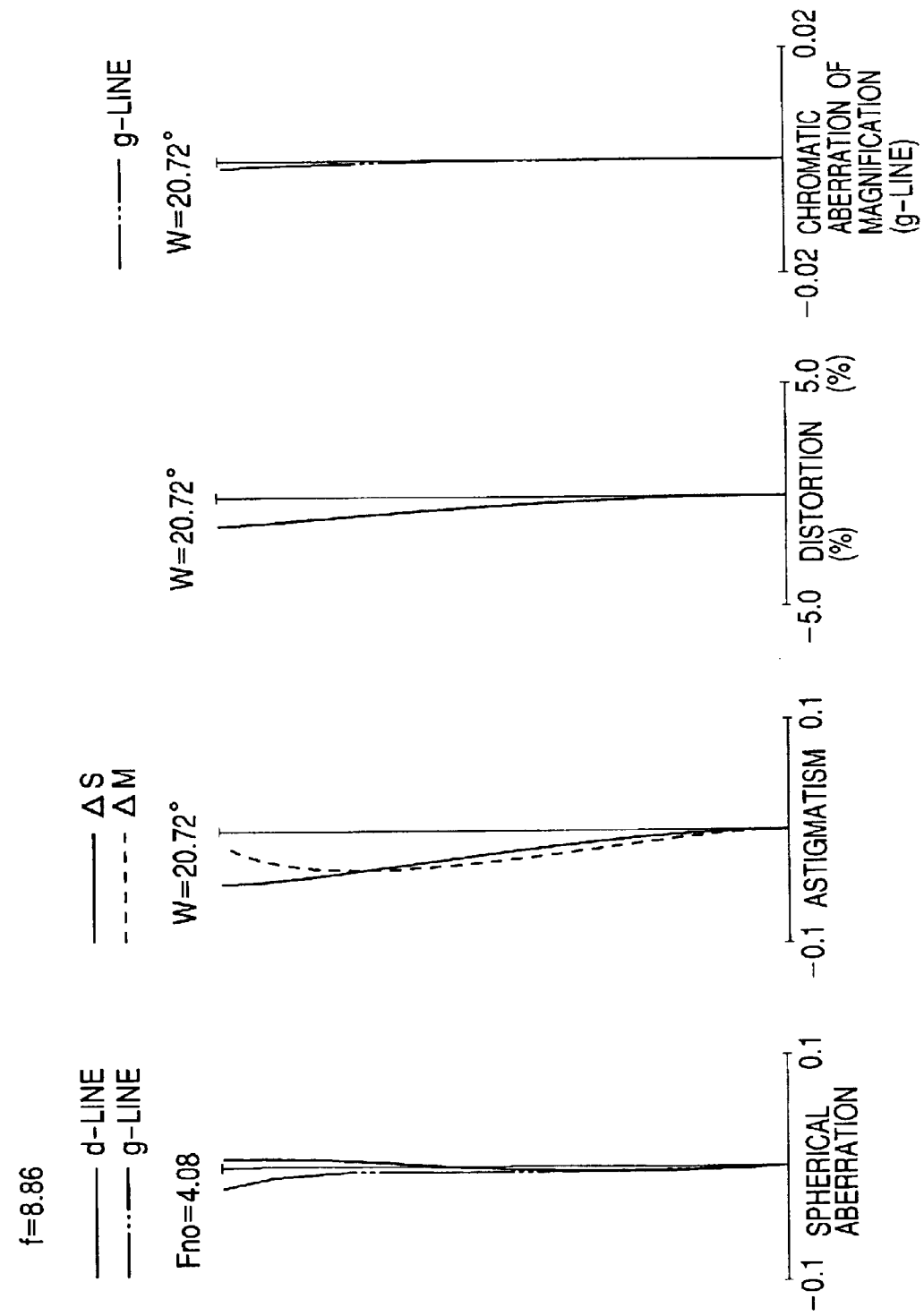

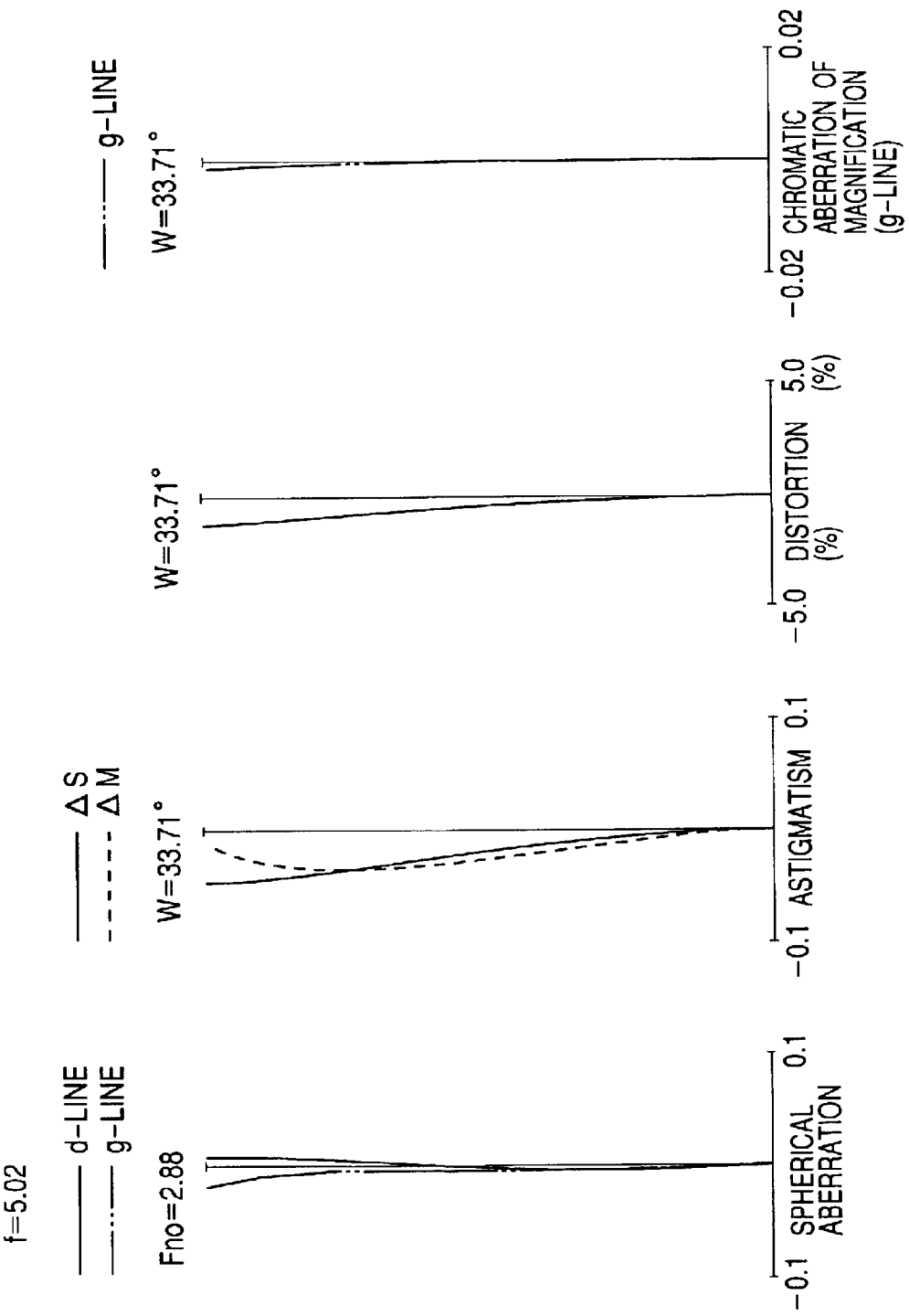

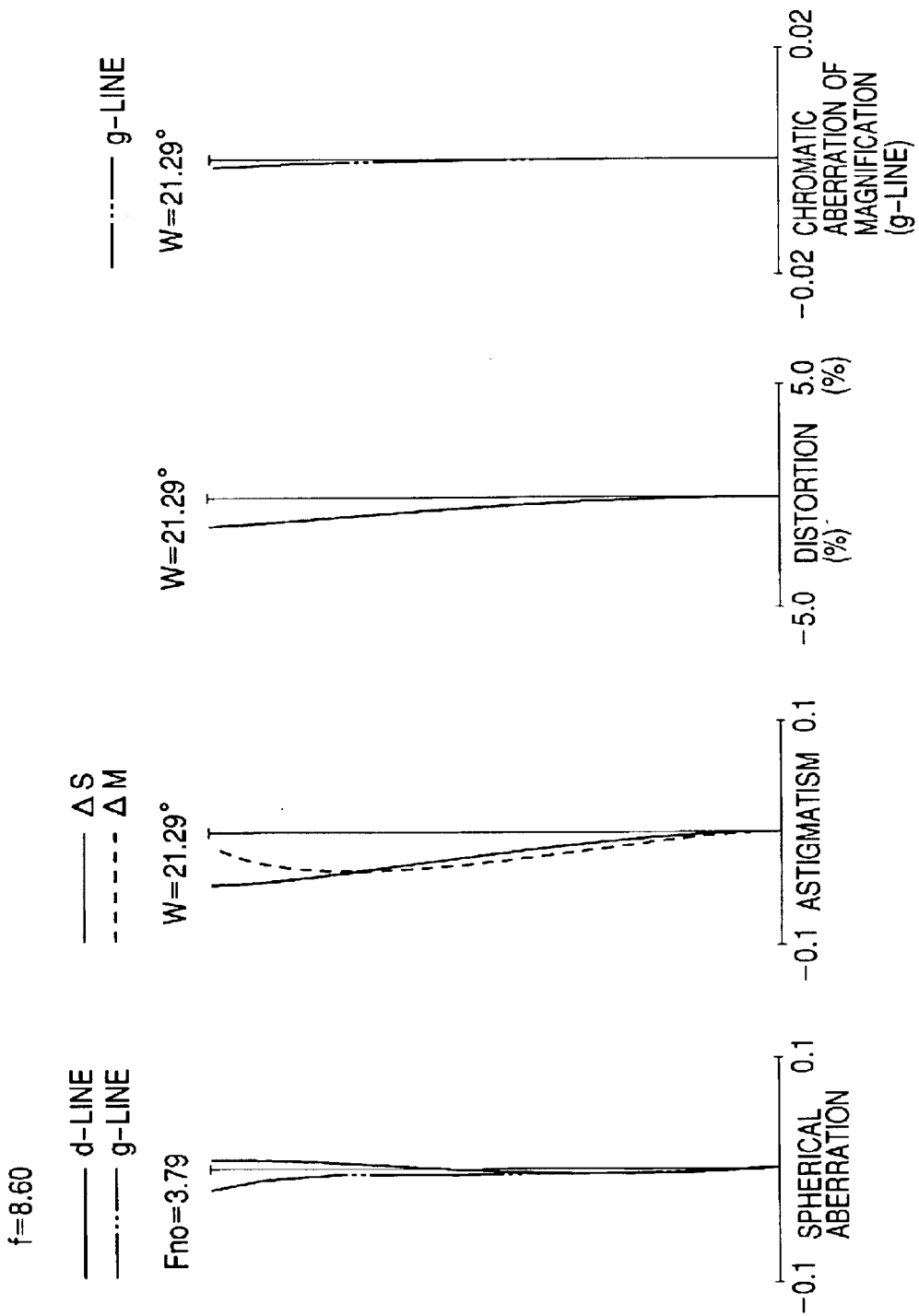

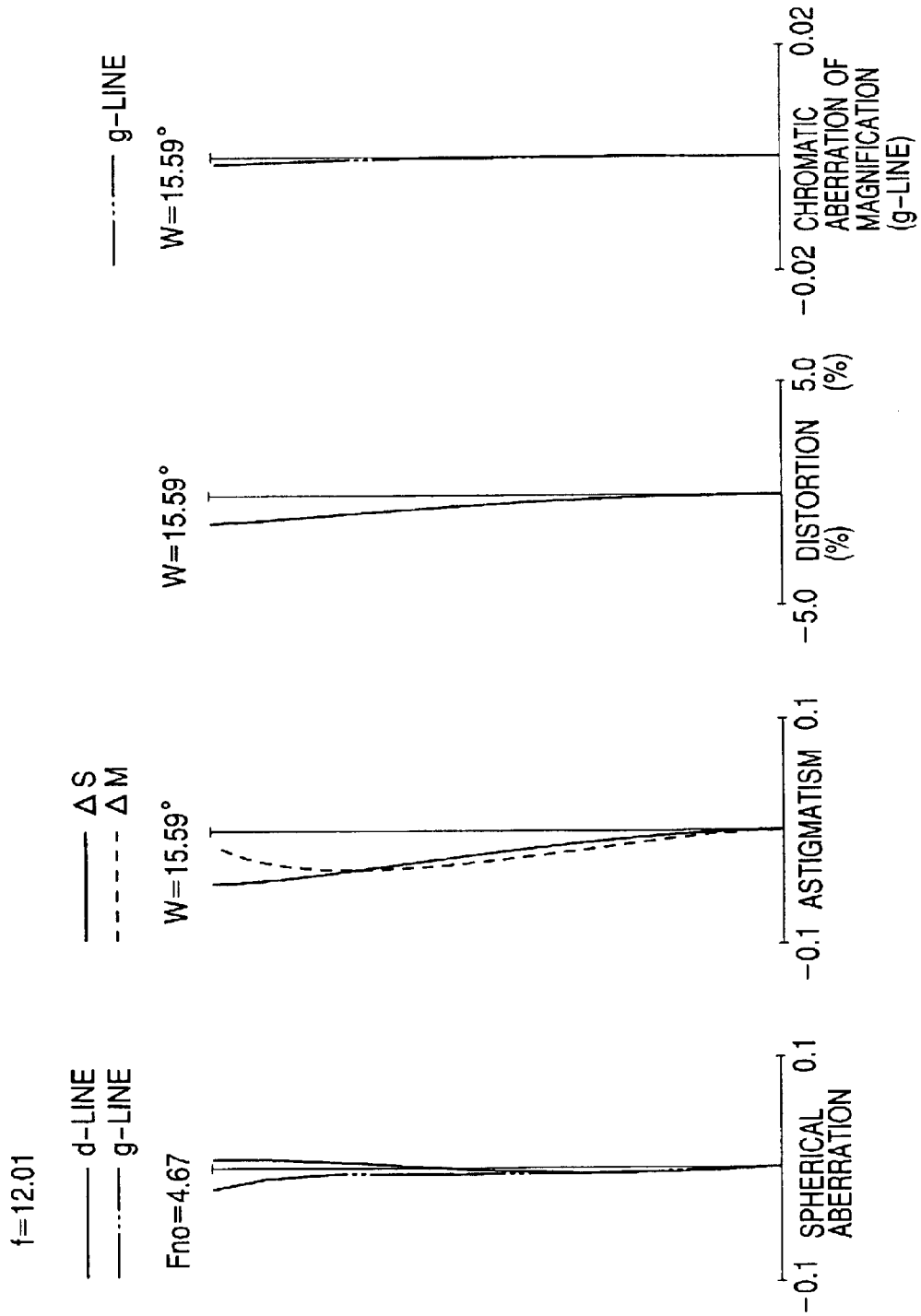

ZOOM LENS AND CAMERA HAVING THE SAME

BACKGROUND OF THE INVENTION

1. Field of the Invention

This invention relates to a compact zoom lens having a wide angle of field suitable for use in a digital still camera, a video camera, a camera for film, etc., and particularly to a zoom lens excellent in portability in which the widening of the photographing angle of field is achieved and of which the shortening of the full length is achieved.

2. Description of Related Art

Recently, with the higher function of cameras (optical apparatuses) such as a video camera using a solid state image pickup device, a digital camera and an electronic still camera, the compatibility of high optical performance and compactness has been required of optical systems using the same.

In a camera of this kind, it is necessary to dispose various optical members such as a low-pass filter and a color correcting filter between a lens rearmost portion and an image pickup device and therefore, a lens system having a relatively great back focal length is required of an optical system used therein. Further, in the case of a camera using a color image pickup device, in order to avoid color shading, as an optical system used therein, one which is good in the telecentric characteristic on the image side from which the exit pupil position is distant is desired.

As a means for achieving these requirements, there have heretofore been proposed various two-unit zoom lenses of the so-called negative lead type which comprise two lens units, i.e., a first lens unit of negative refractive power and a second lens unit of positive refractive power, and in which focal length change is effected by varying the interval between the two lens units. In these zoom optical systems of the negative lead type, the second lens unit of positive refractive power is moved to thereby effect focal length change, and the first lens unit of negative refractive power is moved to thereby effect the correction of an image point position resulting from the focal length change. In the lens construction comprising these two lens units, the zoom magnification is about double.

Also, among zoom lenses used in photographing apparatuses (optical apparatuses) using CCD such as video cameras, there is a lens type of three to five lens units in which the lens unit most adjacent to the object side begins with lens units of positive, negative and positive refractive power fixed during zooming.

For example, in Japanese Patent Application Laid-Open No. 63-81313 (corresponding U.S. Pat. No. 4,802,747), there is proposed a zoom lens having four lens units of positive, negative, positive and positive refractive power and having a variable power ratio of the order of three times. Also, as a zoom lens of a higher variable power ratio, for example in Japanese Patent Application Laid-Open No. 3-296706, there is proposed a zoom lens having four lens units of positive, negative, positive and positive refractive power and having a variable power ratio of the order of ten times.

On the other hand, as a zoom lens for an electronic still camera for photographing still pictures by the use of a CCD, there is desired an optical system very short in the full length of the lens and having, in terms of the characteristic of still pictures, a wide angle of field and having higher optical performance than a zoom lens used in a video camera for moving pictures.

As a lens having a relatively low variable power ratio of the order of 2.5 to three times as described above, but covering a wide angle area and bright and capable of obtaining high performance, there is proposed in Japanese Patent Publication No. 6-66008 (corresponding U.S. Pat. No. 4,662,723), etc. a zoom lens having two lens units of negative and positive refractive power and changing in focal length by a change in the air space between the lens units.

Further, in order to make an entire lens up to a shape having double or higher variable power ratio and yet compact, there are proposed, for example, in Japanese Patent Publication No. 7-3507 (corresponding U.S. Pat. No. 4,810,072), Japanese Patent Publication No. 6-40170 (corresponding U.S. Pat. No. 4,647,160), etc. so-called three-unit zoom lenses in which a third lens unit of positive refractive power is disposed on the image side of a two-unit zoom lens to thereby effect the correction of aberrations occurring with the tendency toward a higher variable power ratio.

In Japanese Patent Application Laid-Open No. 7-52256, there is proposed a zoom lens which comprises three lens units of negative, positive and positive refractive power and in which the spacing between the second lens unit and the third lens unit widens during the zooming from the wide angle end to the telephoto end.

In U.S. Pat. No. 5,434,710, there is disclosed a zoom lens which comprises three lens units of negative, positive and positive refractive power and in which the interval between the second lens unit and the third lens unit decreases during the zooming from the wide angle end to the telephoto end.

In Japanese Patent Application Laid-Open No. 60-31110 (corresponding U.S. Pat. No. 4,687,302), there is proposed a zoom lens which comprises four lens units of negative, positive, positive and positive refractive power and in which the interval between the second lens unit and the third lens unit decreases during the zooming from the wide angle end to the telephoto end and the fourth lens unit is fixed during the zooming.

In Japanese Patent Application Laid-Open No. 10-104520, there is disclosed a zoom lens which comprises three lens units of negative, positive and positive refractive power or four lens units of negative, positive, positive and positive refractive power.

In Japanese Patent Application Laid-Open No. 11-23967 (corresponding U.S. Pat. No. 6,124,984), there is disclosed a zoom lens which comprises three lens units of negative, positive and positive refractive power and in which the second lens unit is divided into two lens units 2a and 2b and which has a variable power ratio of about three times beyond the air space between the two. In Japanese Patent Application Laid-Open No. 11-84243 (corresponding U.S. Pat. Nos. 6,191,896 and 6,233,099), there is disclosed a four-unit zoom lens which comprises four lens units of negative, positive, positive and positive refractive power and in which a stop is disposed rearwardly of the second lens unit.

In recent years, solid state image pickup devices have been advanced toward more pixels, and a pixel size at a particular image size tends to become smaller. Along with this, as a photo-taking lens, there is required one having higher optical performance as compared with a conventional one of the same image size.

Accordingly, in the design limitation that the securing of a lens back (back focal length) necessary to insert a filter or the like rearwardly of a lens system and the telecentric characteristic of the emergence side (the exit pupil position lying at a great distance (infinity)) are compatible, it has become more difficult to realize a zoom lens of which the full length is shortened and which is compact and has a high variable power ratio.

SUMMARY OF THE INVENTION

The present invention has as its object to provide, with the conventional lens system taken into account, a zoom lens in which the number of constituent lenses is small and which is compact and has excellent optical performance and is good in telecentric characteristic on the emergence side, and an optical apparatus using the same.

A zoom lens according to one aspect of the present invention comprises, in order from the object side to the image side, a first lens unit of negative optical power, and a second lens unit of positive optical power. The interval between the first lens unit and the second lens unit is changed to thereby effect zooming. The zoom lens is characterized in that the second lens unit has, in order from the object side to the image side, an aspherical positive lens and an aspherical negative lens.

In a zoom lens according to another aspect of the present invention, a second lens unit is comprised of a first lens subunit of positive optical power and a second lens subunit of positive optical power with the greatest spacing in the unit as a boundary. The first lens subunit is comprised, in order from the object side to the image side, two single lenses, i.e., an aspherical positive lens and an aspherical negative lens. When at this time, the spacing between the first lens subunit and the second lens subunit at the wide angle end when the zoom lens is in focus on an infinity object is defined as D2abw and the focal length of the entire system at the wide angle end is defined as fw, the zoom lens is characterized in that the condition that $$0.2 < d2abw/fw < 1.0$$

is satisfied.

BRIEF DESCRIPTION OF THE DRAWINGS

FIGS. 2A, 2B, 2C and 2D show the aberrations at the wide angle end of the zoom lens according to Numerical Embodiment 1.

FIGS. 3A, 3B, 3C and 3D show the aberrations at the intermediate zoom position of the zoom lens according to Numerical Embodiment 1.

FIGS. 4A, 4B, 4C and 4D show the aberrations at the telephoto end of the zoom lens according to Numerical Embodiment 1.

FIGS. 6A, 6B, 6C and 6D show the aberrations at the wide angle end of the zoom lens according to Numerical Embodiment 2.

FIGS. 7A, 7B, 7C and 7D show the aberrations at the intermediate zoom position of the zoom lens according to Numerical Embodiment 2.

FIGS. 8A, 8B, 8C and 8D show the aberrations at the telephoto end of the zoom lens according to Numerical Embodiment 2.

FIGS. 10A, 10B, 10C and 10D show the aberrations at the wide angle end of the zoom lens according to Numerical Embodiment 3.

FIGS. 11A, 1B, 11C and 11D show the aberrations at the intermediate zoom position of the zoom lens according to Numerical Embodiment 3.

FIGS. 12A, 12B, 12C and 12D show the aberrations at the telephoto end of the zoom lens according to Numerical Embodiment 3.

FIGS. 14A, 14B, 14C and 14D show the aberrations at the wide angle end of the zoom lens according to Numerical Embodiment 4.

FIGS. 15A, 15B, 15C and 15D show the aberrations at the intermediate zoom position of the zoom lens according to Numerical Embodiment 4.

FIGS. 16A, 16B, 16C and 16D show the aberrations at the telephoto end of the zoom lens according to Numerical Embodiment 4.

DESCRIPTION OF THE PREFERRED EMBODIMENTS

Some embodiments of the present invention will hereinafter be described with reference to the drawings.

Figure 1A:
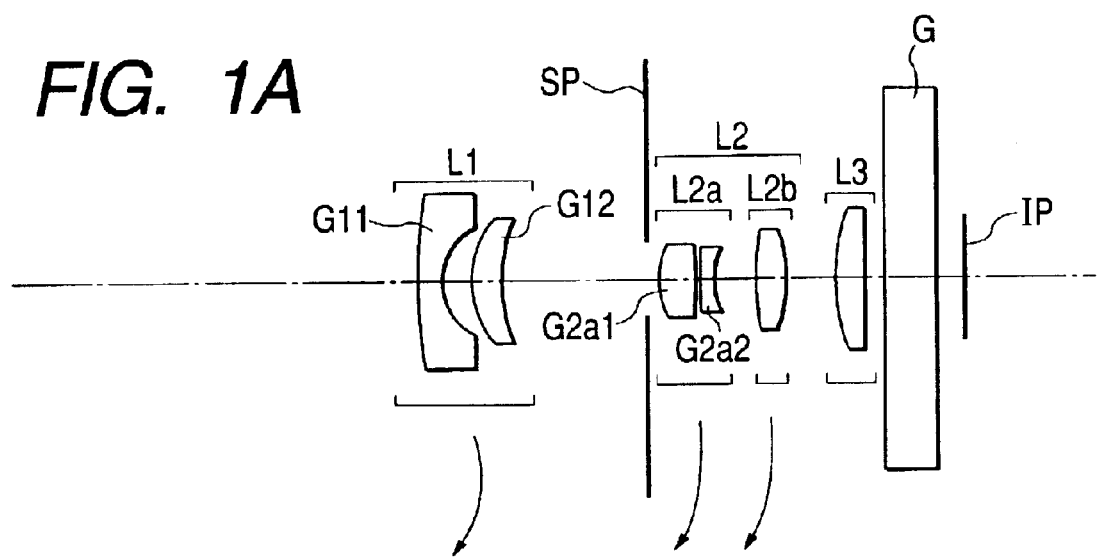
FIGS. 1A, 1B and 1C are optical cross-sectional views of a zoom lens according to Numerical Embodiment 1.
Figure 1B:
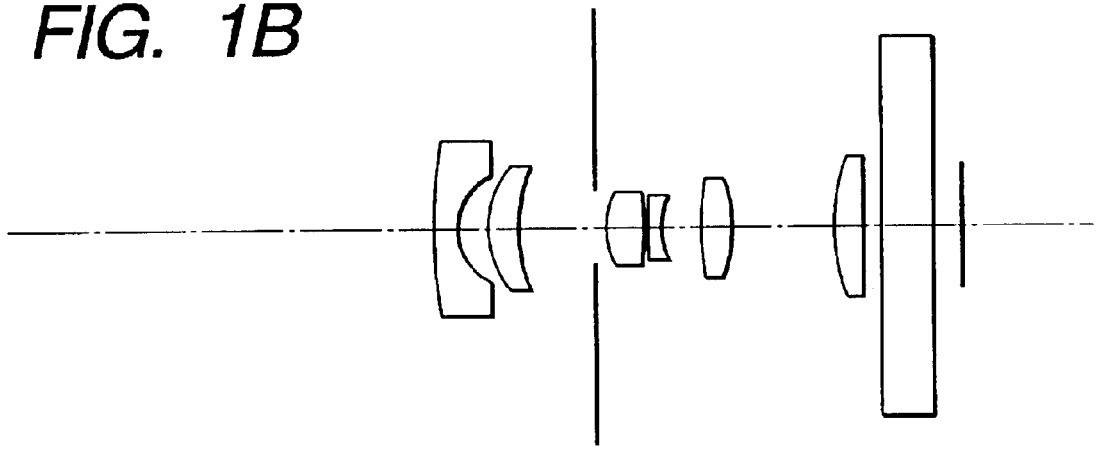
Figure 1C:
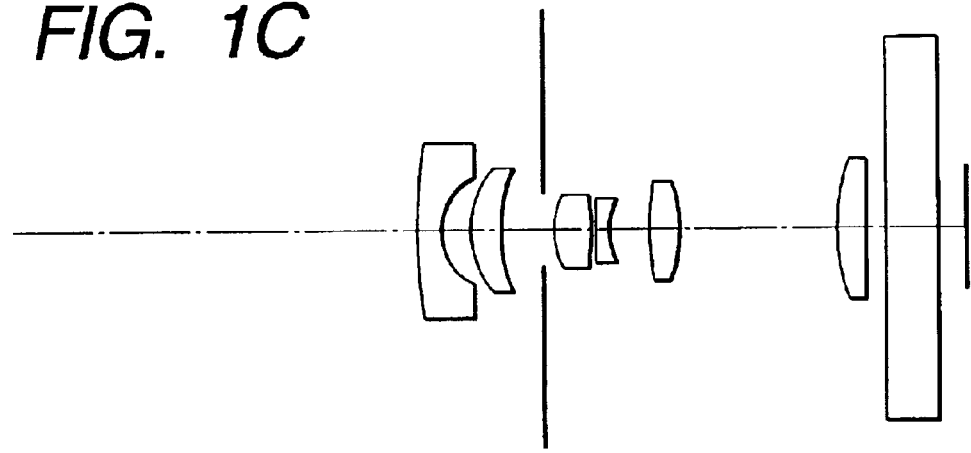

FIGS. 1A, 1B and 1C are lens cross-sectional views of a zoom lens according to Numerical Embodiment 1 which will be described later. FIGS. 2A, 2B, 2C and 2D to FIGS. 4A, 4B, 4C and 4D show the aberrations at the wide angle end, the intermediate zoom position and the telephoto end of the zoom lens according to Numerical Embodiment 1.

Figure 5A:
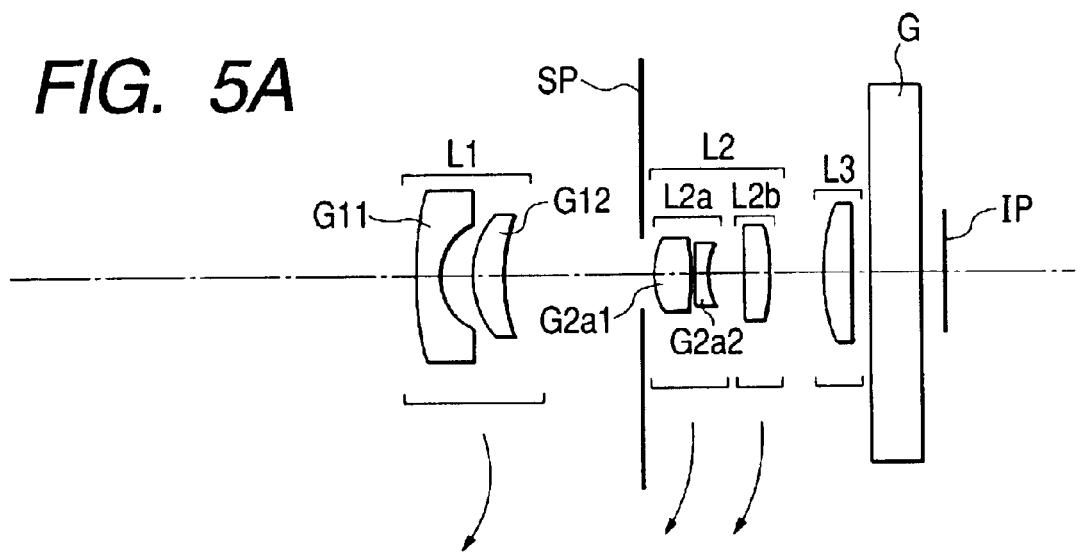
FIGS. 5A, 5B and 5C are optical cross-sectional views of a zoom lens according to Numerical Embodiment 2.
Figure 5B:
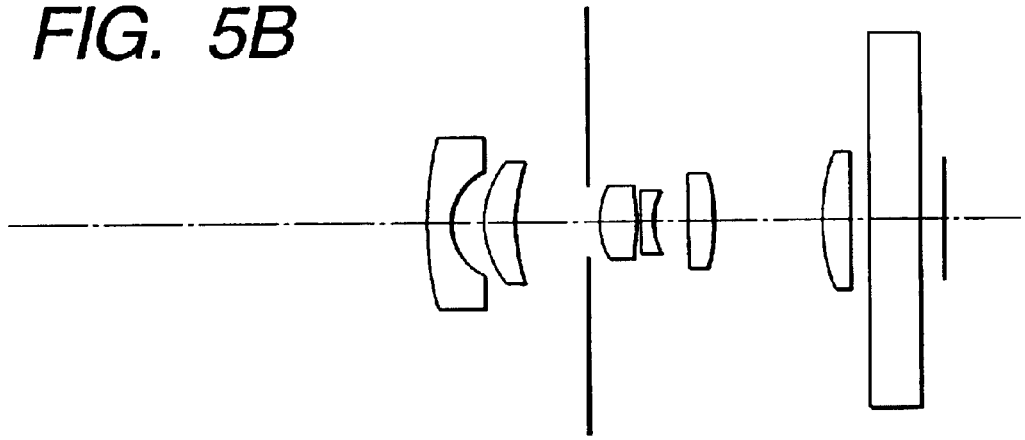
Figure 5C:
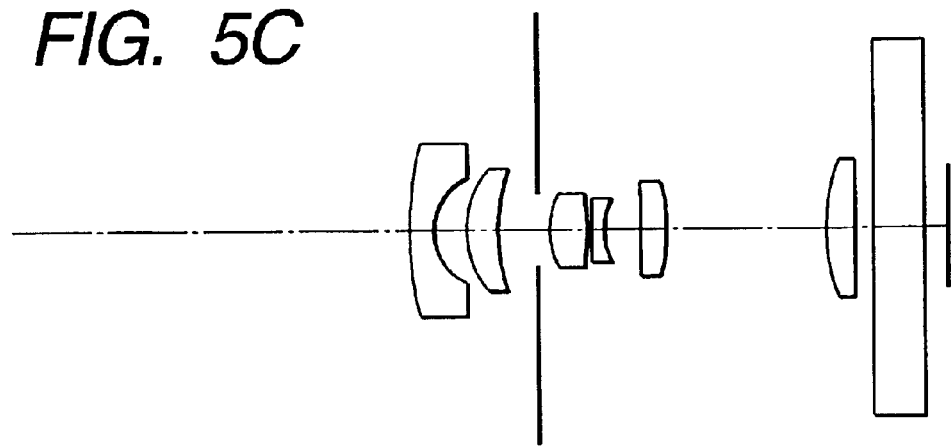

FIGS. 5A, 5B and 5C are lens cross-sectional views of a zoom lens according to Numerical Embodiment 2 which will be described later. FIGS. 6A, 6B, 6C and 6D to FIGS. 8A, 8B, 8C and 8D shows the aberrations at the wide angle end, the intermediate zoom position and the telephoto end of the zoom lens according to Numerical Embodiment 2.

Figure 9A:
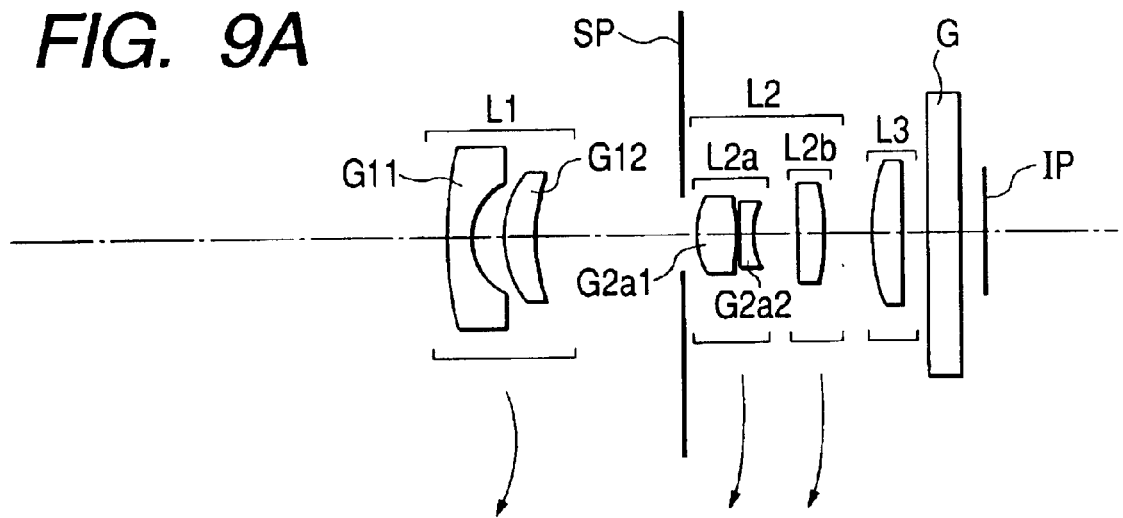
FIGS. 9A, 9B and 9C are optical cross-sectional views of a zoom lens according to Numerical Embodiment 3.
Figure 9B:
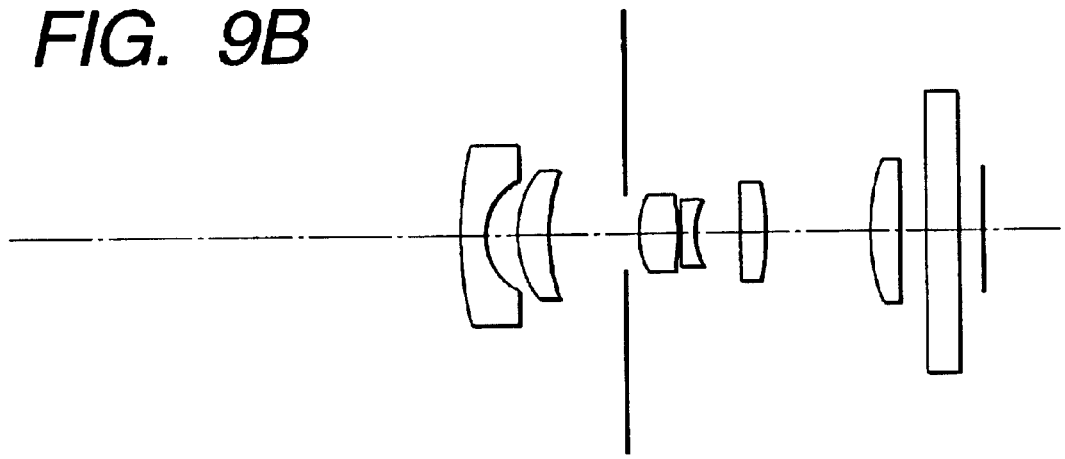
Figure 9C:
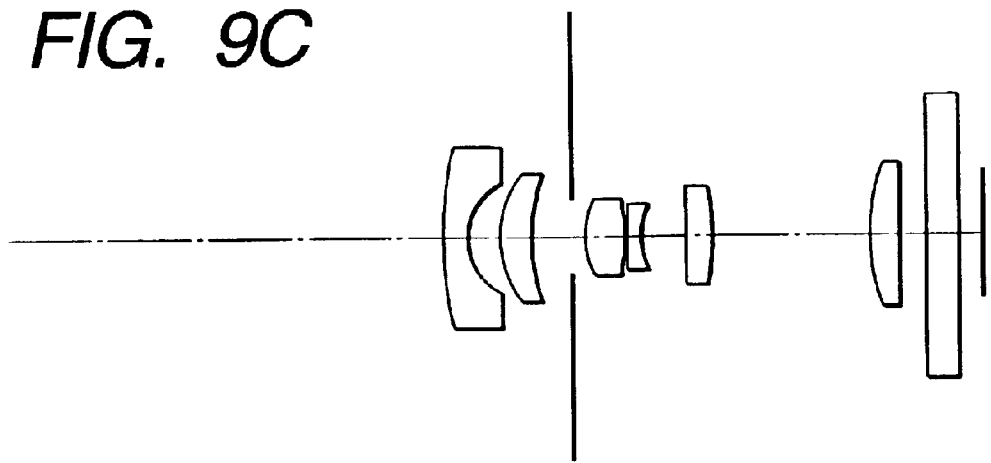

FIGS. 9A, 9B and 9C are lens cross-sectional views of a zoom lens according to Numerical Embodiment 3 which will be described later. FIGS. 10A, 10B, 10C and 10D to FIGS. 12A, 12B, 12C and 12D shows the aberrations at the wide angle end, the intermediate zoom position and the telephoto end of the zoom lens according to Numerical Embodiment 3.

Figure 13A:
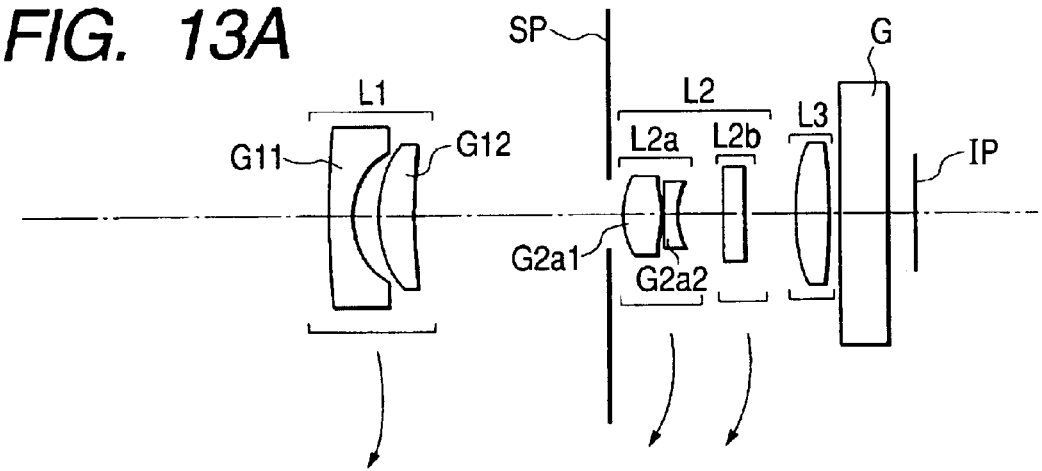
FIGS. 13A, 13B and 13C are optical cross-sectional views of a zoom lens according to Numerical Embodiment 4.
Figure 13B:
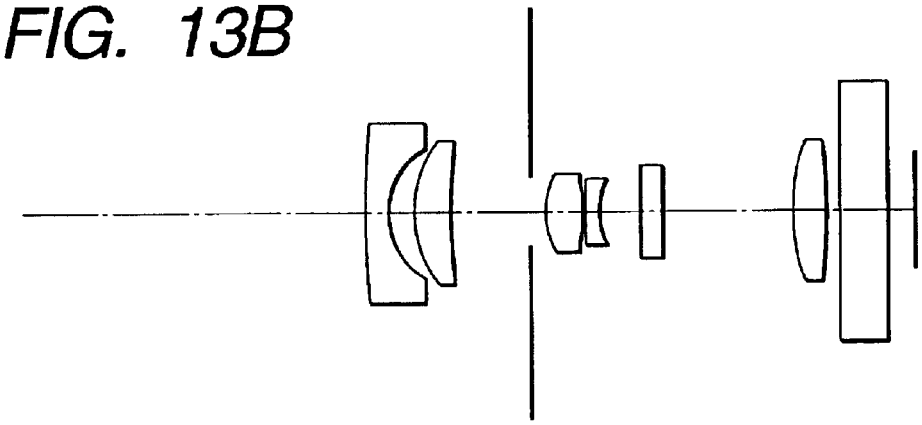
Figure 13C:
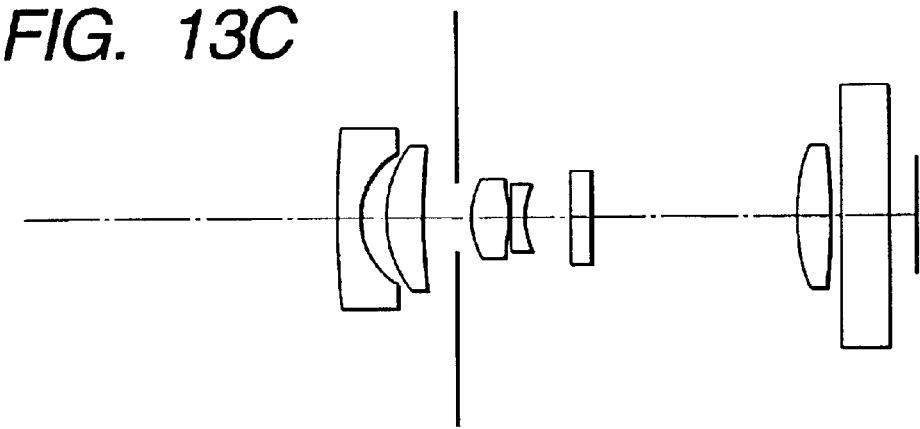

FIGS. 13A, 13B and 13C are lens cross-sectional views of a zoom lens according to Numerical Embodiment 4 which will be described later. FIGS. 14A, 14B, 14C and 14D to FIGS. 16A, 16B, 16C and 16D show the aberrations at the wide angle end, the intermediate zoom position and the telephoto end of the zoom lens according to Numerical Embodiment 4.

In the lens cross-sectional views of the zoom lenses according to the respective numerical embodiments shown in FIGS. 1, 5A through 5C, 9 and 13A through 13C, L1 designates a first lens unit of negative refractive power (optical power=inverse number of the focal length), L2 denotes a second lens unit of positive refractive power, L3 designates a third lens unit of positive refractive power, SP denotes an aperture stop, and IP designates an image plane on which an image pickup device (a photoelectric conversion element) such as a CCD or MOS is to be disposed. G denotes a glass block corresponding to a filter, a color separating prism or the like.

The first lens unit L1 comprises, in order from the object side, a positive lens G11 which is great in the absolute value of the refractive power (great in the absolute value of the curvature) of the surface on the image side as compared with the object side, and a meniscus-shaped positive lens G12 having its convex surface facing the object side. The positive lens G11 is an aspherical lens including an aspherical surface.

The second lens unit L2 comprises a first lens subunit L2a of positive refractive power and a second lens subunit L2b of positive refractive power with the greatest air space in the lens unit as a boundary. The first lens subunit L2a comprises, in order from the object side, a positive lens G2a1 including an aspherical surface, and a negative lens G2a2 including an aspherical surface. The second lens subunit, in each numerical embodiment, comprises a positive lens, but may comprise a cemented lens of positive refractive power, and can be a single lens component.

The first lens subunit L2a uses a material of high refractive index and low dispersion for the positive lens G2a1, and a material of high refractive index and high dispersion for the negative lens G2a2, and well corrects the on-axis chromatic aberration in the entire zoom area.

Also, in the present embodiment, the second lens subunit L2b is moved in the direction of the optical axis thereof to thereby perform the focusing operation from an infinity object to a finite distance object. By adopting the so-called inner focus type in which the compact and light-weight second lens subunit L2b is moved to thereby effect focusing, as described above, quick focusing is made easy. By appropriately setting the lens construction, the aberration fluctuation during focusing is made small.

In the zoom lens according to the present embodiment, the first lens unit L1, the second lens unit L2 and the third lens unit L3 disposed in order from the object side are moved so that relative to the wide angle end, the interval between the first lens unit L1 and the second lens unit L2 at the telephoto end may become small and the interval between the second lens unit L2 and the third lens unit L3 may become great, to thereby effect zooming. In case of zooming, the second lens unit L2 is moved toward the object side to thereby effect main focal length change, and the first lens unit L1 is substantially reciprocally moved with a locus convex toward the image side to thereby correct the movement of the image point resulting from focal length change. The second lens unit L2 has the positive lens G2a1 and the negative lens G2a2 both of which include an aspherical surface, and well corrects any aberration fluctuation resulting from focal length change.

In the zoom lenses according to Numerical Embodiments 1, 2 and 4 of the present embodiment, in case of zooming, the first lens subunit L2a and the second lens subunit L2b constituting the second lens unit L2 are moved toward the object side while the interval therebetween is slightly varied, and in the zoom lens according to Numerical Embodiment 3, the first lens subunit L2a and the second lens subunit L2b are integrally moved toward the object side without the interval therebetween being varied. Embodiments like Numerical Embodiments 1, 2 and 4 in which the interval between the first lens subunit L2a and the second lens subunit L2b is varied in case of zooming can be regarded as a four-unit zoom lens comprising four lens units, but in the present embodiment, these are handled in the same category with the zoom lens according to Numerical Embodiment 3 in which the interval between the first lens subunit L2a and the second lens subunit L2b is not varied, as a substantial three-unit zoom lens. Of course, this is the definition only herein, and Numerical Embodiments 1, 2 and 4 may be called a four-unit zoom lens.

In the present embodiment, even in a type wherein the interval between the first lens subunit L2a and the second lens subunit L2b is varied in case of zooming, structure in which the second lens subunit L2b is placed on the same cam as the first lens subunit L2a and a variation in the difference from the first lens subunit L2a at each object distance is driven by an actuator operatively associated with the second lens unit L2 during zooming is adopted to thereby achieve the simplification of mechanical structure.

In the present embodiment, the third lens unit L3 is not moved in case-of zooming, and does not contribute to focal length change. However, it bears part of the refractive power of the entire system increasing with the downsizing of the image pickup device, and decreases the refractive power of a short zoom system constituted by the first and second lens units to thereby suppress the occurrence of aberrations particularly in each lens constituting the first lens unit L1 and achieve good optical performance. Also, particularly telecentric imaging on the image side necessary for a photographing apparatus using a solid state image pickup device is easily realized by giving the third lens unit L3 the role of a field lens. However, the degree of difficulty increases in constructing an image side telecentric optical system, but it is not impossible to realize the zoom lens which is the object of the present invention and therefore, depending on design conditions, it is also possible to omit the third lens unit L3.

The third lens unit L3 is made stationary in case of zooming and focusing to thereby achieve the simplification of lens barrel structure. In all numerical embodiments of the zoom lens according to the present embodiment, the third lens unit L3 is made stationary during zooming, but may be moved. According to this, the lens barrel structure becomes complicated, but it becomes easy to make the aberration fluctuation during zooming smaller.

Also, the stop SP is disposed most adjacent to the object side (immediately before the object side) of the second lens unit L2 and the distance between the entrance pupil on the wide angle side and the first lens unit L1 is shortened to thereby suppress any increase in the outer diameter of the lenses constituting the first lens unit L1. The stop SP is moved with the second lens unit L2 in case of zooming.

In the zoom lens of the present invention, attention is paid to the fact in such a zoom lens according to the present embodiment that "in order from the object side, a lens unit of negative refractive power and a lens unit of positive refractive power are arranged and the interval between the two lens units is varied to thereby effect focal length change", and it is adopted as a basic construction. It is a basic feature that the second lens unit L2 has the aspherical positive lens G2a1 and the aspherical negative lens G2a2 in the first lens subunit L2a. Of course, in the zoom lens of the present invention, there is included a case whereas in the present embodiment, a lens unit succeeds the second lens unit L2 toward the image side, as well as a case where the zoom lens is comprised of only two lens units.

Description will now be made of conditions which are satisfied by the zoom lens according to the present embodiment. In the present invention, it is preferable in optical performance that at least one of the following conditions be satisfied.

(a-1) When the refractive index of the aspherical negative lens G2a2 in the first lens subunit L2a is defined as Nn, the condition that $$1.75 < Nn < 1.95 \tag{1}$$

is satisfied.

Conditional expression (1) is for enhancing the effect of the aspherical surfaces by the aspherical negative lens G2a2 of which the refractive index is prescribed by this conditional expression, and the aspherical positive lens G2a1 disposed on the object side thereof, and correcting coma with good balance.

In the case below the lower limit value of conditional expression (1), the correction effect of the aspherical surfaces will be deficient, and this is not good. On the other hand, in the case of a material of such a high refractive index as exceeds the upper limit value, it will become difficult to work it into a aspherical surface, and this is not preferable.

More preferably, the numerical value range of conditional expression (1) may be set as follows:

$$1.82 < Nn < 1.85 \tag{1a}$$

(a-2) When the Abbe numbers of the positive lens G2a1 and negative lens G2a2 in the first lens subunit L2a are defined as νp and νn, respectively, $$15 < \nu n - \nu p \tag{2}$$

is satisfied.

Conditional expression (2) is a condition for reducing chiefly the fluctuation of chromatic aberration resulting from focal length change. In the case below the lower limit value of conditional expression (2), it will become difficult to well correct chromatic aberration in the entire zoom area.

More preferably, the numerical value range of conditional expression (2) may be set as follows:

$$20 < \nu n - \nu p \tag{2a}$$

(a-3) When the on-axis distance from the image side surface of the positive lens G2a1 in the first lens subunit L2a to the image side surface of the negative lens G2a2 is defined as D2a, the condition that $$0.1 < D2a/fw < 0.3 \tag{3}$$

is satisfied.

Conditional expression (3) relates to the interval between the positive lens G2a1 and negative lens G2a2 constituting the first lens subunit L2a, and the thickness of the negative lens G2a2 itself.

If the distance becomes too small beyond the lower limit value of conditional expression (3), the correction of coma around the image field in the wide angle area will become difficult. If the distance becomes too great beyond the upper limit value of conditional expression (3), the on-axis thickness of the entire first lens subunit L2a will become great and therefore, the length of the sunk barrel will become great, and this is not good.

More preferably, the numerical value range of conditional expression (3) may be set to $$0.15 < D2a/fw < 0.21 \tag{3a}$$

(a-4) When the radii of curvature of the object side and image side surfaces of the aspherical negative lens G2a2 in the first lens subunit L2a are defined as Rn1 and Rn2, respectively, the condition that $$0.5 < (Rn1+Rn2)/(Rn1-Rn2) < 1.8 \tag{4}$$

is satisfied.

Conditional expression (4) relates to the shape factor (lens shape) of the aspherical negative lens G2a2, and is a condition for effecting aberration correction better, together with the aberration correction effect of the two aspherical surfaces in the second lens unit L2.

If the upper limit value or the lower limit value of conditional expression (4) is exceeded, the correction of coma flare in the wide angle area will become difficult, and this is not good.

More preferably, the numerical value range of conditional expression (4) may be set to $$0.6 < (Rn1+Rn2)/(Rn1-Rn2) < 1.4 \tag{4a}$$

(a-5) When the focal length of the aspherical positive lens G2a1 in the first lens subunit L2a is defined as f2P and the focal length of the aspherical negative lens G2a2 is defined as f2n, the condition that $$-1.0 < f2P/f2n < -0.6 \tag{5}$$

is satisfied.

Conditional expression (5) relates to the ratio between the focal lengths of the positive lens G2a1 and the negative lens G2a2 disposed on the object side in the first lens subunit L2a, and is a condition for well correcting on-axis chromatic aberration by a small number of lenses.

By the aspherical surface of each lens in the first lens subunit L2a, the other aberrations than chromatic aberration can be well corrected even by a small number of lenses, but to better correct the on-axis chromatic aberration, it is necessary to satisfy conditional expression (5). If the balance of the power ratio (refractive power ratio) between the positive lens G2a1 and the negative lens G2a2 is destroyed beyond the upper limit value or the lower limit value of conditional expression (5), the correction of the on-axis chromatic aberration will become difficult particularly in the telephoto area.

More preferably, the numerical value range of conditional expression (5) may be set to $$-0.9 < f2P/f2n < -0.7 \tag{5a}$$

(a-6) When the interval between the first lens subunit L2a and the second lens subunit L2b at the wide angle end when the zoom lens is focused on an infinity object is defined as d2bw and the focal length of the entire system at the wide angle end is defined as fw, the condition that $$0.2 < d2abw/fw < 1.0 \tag{6}$$

is satisfied.

Conditional expression (6) standardizes the interval between the first lens subunit L2a and the second lens subunit L2b at the wide angle end by the focal length at the wide angle end.

If the interval between the first lens subunit L2a and the second lens subunit L2b becomes too great beyond the upper limit value of conditional expression (6), the driving mechanism when driving the second lens subunit L2b will become bulky, and this is not good. If the interval between the first lens subunit L2a and the second lens subunit L2b becomes too small beyond the lower limit value of conditional expression (6), the exit pupil position will become too short at the wide angle end and the influence of shading will become great, and this is not good.

More preferably, the numerical value range of conditional expression (6) may be set as follows:

$$0.3 < d2abw/fw < 0.6 \tag{6a}$$

Another aspect of the invention specifies that in addition to the aforedescribed basic construction, it also satisfies this conditional expression (6).

(a-7) When the focal length of the first lens unit L1 is defined as f1 and the focal length of the second lens subunit L2b is defined as f2b, the conditions that $$-2.5 < f1/fw < -1.5 \quad (7)$$

$$2.5 < f2b/fw < 6.5 \quad (8)$$

are satisfied.

Conditional expression (7) standardizes the focal length of the first lens unit L1 by the focal length at the wide angle end. If the power (refractive power) of the first lens unit L1 becomes too strong beyond the upper limit value of conditional expression (7), it will become difficult to correct the coma around the image field in the wide angle area. If the power of the first lens unit L1 becomes too weak beyond the lower limit value of conditional expression (7), the full length of the lens will increase, and this is not good.

Conditional expression (8) standardizes the focal length of the second lens subunit L2b by the focal length at the wide angle end. If the power of the second lens subunit L2b becomes weak beyond the upper limit value of conditional expression (8), the full length of the lens tends to increase when an attempt is made to secure the exit pupil of a predetermined length in the wide angle area. On the other hand, if the power of the second lens subunit L2b becomes too strong beyond the lower limit value of conditional expression (8), the correction of aberrations will become difficult in the telephoto area.

More preferably, the numerical value ranges of conditional expressions (7) and (8) may be set as follows:

$$-2.2 < f1/fw < -1.7 \quad (7a)$$

$$3.1 < f2b/fw < 5.7 \quad (8a)$$

The features of the zoom lenses according to Numerical Embodiments 1 to 4 will now be described in detail.

In Numerical Embodiments 1 to 4, the first lens unit L1 is comprised of two single lenses, i.e., a negative meniscus lens having a convex surface on the object side thereof and an aspherical surface on the image side thereof, and a positive meniscus lens having a convex surface on the object side thereof.

In Numerical Embodiments 1 to 4, the first lens subunit L2a is comprised of two single lenses, i.e., a biconvex positive lens great in the absolute value of the refractive power (great in the absolute value of the curvature) of the object side surface as compared with the image side, and having an aspherical surface on the object side, and a negative lens great in the absolute value of the refractive power (great in the absolute value of the curvature) of the image side surface as compared with the object side, and having an aspherical surface on the image side. The aspherical negative lens of the first lens subunit L2a, in Numerical Embodiments 1 and 2, is a meniscus negative lens having a convex surface on the object side thereof, and in Numerical Embodiments 3 and 4, is a biconcave negative lens.

In Numerical Embodiments 1 to 4, the third lens unit L3 is comprised of a positive lens great in the absolute value of the refractive power (great in the absolute value of the curvature) of the object side surface thereof as compared with the image side.

In Numerical Embodiments, 1 to 4, the second lens subunit L2b is comprised of a biconvex positive lens. The second lens subunit L2b, as previously described, may be comprised of a cemented lens comprising a positive lens and a negative lens.

In case of zooming, the interval between the first lens subunit L2a and the second lens subunit L2b, in Numerical Embodiment 1, decreases at the telephoto end as compared with the wide angle end. In Numerical Embodiments 2 and 4, the aforementioned interval once decreases from the wide angle end toward the telephoto end, and thereafter increases. At this time, the air space is somewhat greater at the telephoto end than at the wide angle end. In Numerical Embodiment 3, it does not vary.

In Numerical Embodiments 1 to 4, focusing is effected by the second lens subunit L2b, but alternatively may be effected by other lens unit (the first lens subunit L2a or the third lens unit.

The numerical data of Numerical Embodiments 1 to 4 will be shown below. In each numerical embodiment, i indicates the order of the surface from the object side, Ri indicates the radius of curvature of the ith surface, Di indicates the thickness or air space of the member between the ith surface and the (i+1)th surface, and Ni and vi indicate the refractive index and Abbe number of the ith member, respectively, for d-line. The two surfaces most adjacent to the image side are a glass block G corresponding to a rock crystal low-pass filter, an infrared cut filter or the like. When the displacement in the direction of the optical axis at the position of a height H from the optical axis is X with the surface vertex as the reference, the aspherical shape is represented by $$X = \frac{(1/R)H^2}{1 + \sqrt{1 - (1+k)(H/R)^2}} + AH^2 + BH^4 + CH^6 + DH^8 + EH^{10},$$

where R represents the paraxial radius of curvature, k is a cone constant, and A, B, C, D and E are aspherical coefficients.

Also, [e-X]s means "$\times 10^{-x}$".

Also, the relations between the aforedescribed conditional expressions and the various numerical values in the numerical embodiments will be shown in Table 1 below.

| Numerical Embodiment 1 | | | |
|---|---|---|---|
| f = 4.49 – 8.61 | Fno = 2.88 – 4.06 | 2ω = 73.5 – 42.5 | |
| R1 = 23.917 | D1 = 1.20 | N1 = 1.740130 | v1 = 49.2 |
| R2 = 2.886 | D2 = 1.60 | | |
| R3 = 5.281 | D3 = 1.60 | N2 = 1.846660 | v2 = 23.9 |
| R4 = 9.254 | D4 = Variable | | |
| R5 = Stop | D5 = 0.59 | | |
| R6 = 4.312 | D6 = 2.00 | N3 = 1.687070 | v3 = 52.6 |
| R7 = –13.960 | D7 = 0.20 | | |
| R8 = 38.775 | D8 = 0.70 | N4 = 1.832430 | v4 = 23.9 |
| R9 = 4.626 | D9 = Variable | | |
| R10 = 21.802 | D10 = 1.50 | N5 = 1.487490 | v5 = 70.2 |
| R11 = –10.430 | D11 = Variable | | |
| R12 = 13.248 | D12 = 1.50 | N6 = 1.487490 | v6 = 70.2 |
| R13 = –137.542 | D13 = 1.00 | | |
| R14 = ∞ | D14 = 2.61 | N7 = 1.516330 | v7 = 64.2 |
| R15 = ∞ | | | |

| Variable Interval | Focal Length | | |
|---|---|---|---|
| | 4.49 | 6.60 | 8.61 |
| D 4 | 7.57 | 3.93 | 2.13 |
| D 9 | 2.22 | 2.12 | 2.18 |
| D11 | 2.64 | 5.50 | 8.20 |

Aspherical Coefficient

Second Surface: k=−1.27013e+00 A=0 B=3.61084e−03 C=3.06032e−05 D=−1.41272e−06 E=1.48507e−07

Sixth Surface: k=5.83107e−01 A=0 B=−1.56459e−03 C=−2.01242e−06 D=−2.53760e−06 E=0.00000e+00

Nineth Surface: k=0.00000e+00 A=0 B=2.65830e−03 C=−1.66959e−05 D=−1.78743e−05 E=1.01857e−05

Numerical Embodiment 2 f = 4.65 – 8.86    Fno = 2.88 – 4.13    2ω = 71.6 – 41.4
| | | | |
|---|---|---|---|
| R1 = 17.410 | D1 = 1.20 | N1 = 1.740130 | ν1 = 49.2 |
| R2 = 2.907 | D2 = 1.81 | | |
| R3 = 5.519 | D3 = 1.60 | N2 = 1.846660 | ν2 = 23.9 |
| R4 = 9.477 | D4 = Variable | | |
| R5 = Stop | D5 = 0.59 | | |
| R6 = 4.065 | D6 = 2.00 | N3 = 1.687070 | ν3 = 52.6 |
| R7 = –13.092 | D7 = 0.20 | | |
| R8 = 48.205 | D8 = 0.70 | N4 = 1.832430 | ν4 = 23.9 |
| R9 = 4.471 | D9 = Variable | | |
| R10 = 43.811 | D10 = 1.50 | N5 = 1.487490 | ν5 = 70.2 |
| R11 = –12.023 | D11 = Variable | | |
| R12 = 13.248 | D12 = 1.50 | N6 = 1.696797 | ν6 = 55.5 |
| R13 = –446.589 | D13 = 1.00 | | |
| R14 = ∞ | D14 = 2.61 | N7 = 1.516330 | ν7 = 64.2 |
| R15 = ∞ | | | |

| Variable Interval | Focal Length | | |
|---|---|---|---|
| | 4.65 | 6.84 | 8.86 |
| D 4 | 7.40 | 3.81 | 2.11 |
| D 9 | 1.89 | 1.78 | 1.98 |
| D11 | 2.76 | 5.74 | 8.41 |

Aspherical Coefficient

Second Surface: k=–1.62957e+00 A=0 B=5.23543e–03
C=–4.56125e–05 D=8.70345e–07 E=1.10972e–07

Sixth Surface: k=4.26982e–01 A=0 B=–1.65814e–03
C=–1.30170e–04 D=–1.60072e–05 E=5.41461e–07

Nineth Surface: k=0.00000e+00 A=0 B=3.12173e–03
C=2.55268e–04 D=–6.67470e–05 E=1.70497e–05

Numerical Embodiment 3 f = 4.65 – 8.86    Fno = 2.88 – 4.08    2ω = 71.5 – 41.4
| | | | |
|---|---|---|---|
| R1 = 25.960 | D1 = 1.20 | N1 = 1.740130 | ν1 = 49.2 |
| R2 = 3.125 | D2 = 1.61 | | |
| R3 = 5.787 | D3 = 1.70 | N2 = 1.846660 | ν2 = 23.9 |
| R4 = 11.186 | D4 = Variable | | |
| R5 = Stop | D5 = 0.70 | | |
| R6 = 4.000 | D6 = 2.00 | N3 = 1.743300 | ν3 = 49.3 |
| R7 = –11.431 | D7 = 0.20 | | |
| R8 = –27.218 | D8 = 0.70 | N4 = 1.832430 | ν4 = 23.9 |
| R9 = 4.828 | D9 = 2.21 | | |
| R10 = 44.071 | D10 = 1.30 | N5 = 1.622296 | ν5 = 53.2 |
| R11 = –17.547 | D11 = Variable | | |
| R12 = 11.053 | D12 = 1.60 | N6 = 1.696797 | ν6 = 55.5 |
| R13 = 136.453 | D13 = 1.25 | | |
| R14 = ∞ | D14 = 1.60 | N7 = 1.516330 | ν7 = 64.1 |
| R15 = ∞ | | | |

| Variable Interval | Focal Length | | |
|---|---|---|---|
| | 4.65 | 6.75 | 8.86 |
| D 4 | 7.51 | 3.91 | 2.02 |
| D 9 | 2.44 | 5.17 | 7.91 |

Aspherical Coefficient

Second Surface: k=–1.18040e+00 A=0 B=2.21207e–03
C=6.47021e–05 D=–5.03611e–06 E=2.27215e–07

Sixth Surface: k=3.15667e–01 A=0 B=–1.17160e–03
C=–9.96037e–05 D=–9.51895e–06 E=–5.32423e–07

Nineth Surface: k=0.00000e+00 A=0 B=4.07929e–03
C=4.90436e–04 D=–9.55969e–05 E=1.90100e–05

Numerical Embodiment 4 f = 5.02 – 12.01    Fno = 2.88 – 4.67    2ω = 67.4 – 31.2
| | | | |
|---|---|---|---|
| R1 = 74.098 | D1 = 1.30 | N1 = 1.802380 | ν1 = 40.8 |
| R2 = 3.845 | D2 = 1.49 | | |
| R3 = 7.209 | D3 = 1.90 | N2 = 1.846660 | ν2 = 23.9 |
| R4 = 23.714 | D4 = Variable | | |
| R5 = Stop | D5 = 0.70 | | |
| R6 = 4.095 | D6 = 2.20 | N3 = 1.743300 | ν3 = 49.3 |
| R7 = –18.137 | D7 = 0.20 | | |
| R8 = –75.585 | D8 = 0.70 | N4 = 1.832430 | ν4 = 23.9 |
| R9 = 4.673 | D9 = Variable | | |
| R10 = 34.980 | D10 = 1.20 | N5 = 1.772499 | ν5 = 49.6 |
| R11 = –55.825 | D11 = Variable | | |
| R12 = 11.631 | D12 = 1.90 | N6 = 1.487490 | ν6 = 70.2 |
| R13 = –38.409 | D13 = 0.60 | | |
| R14 = ∞ | D14 = 2.61 | N7 = 1.516330 | ν7 = 64.2 |
| R15 = ∞ | | | |

| Variable Interval | Focal Length | | |
|---|---|---|---|
| | 5.02 | 8.60 | 12.01 |
| D 4 | 10.76 | 4.41 | 1.91 |
| D 9 | 2.43 | 2.34 | 2.55 |
| D11 | 2.70 | 7.07 | 11.13 |

Aspherical Coefficient

Second Surface: k=–1.00189e+00 A=0 B=6.23845e–04
C=3.20633e–06 D=1.92007e–08 E=–4.78566e–09

Sixth Surface: k=1.65207e–01 A=0 B=–6.64943e–04
C=–1.05354e–05 D=–1.76516e–05 E=–7.92638e–07

Nineth Surface: k=0.00000e+00 A=0 B=3.57839e–03
C=6.52624e–04 D=–1.37864e–04 E=2.444000e–05

TABLE 1

| Conditional Expression | Numerical Embodiment | | | |
|---|---|---|---|---|
| | 1 | 2 | 3 | 4 |
| 1) Nn | 1.83 | 1.83 | 1.83 | 1.83 |
| 2) νn–νp | 28.7 | 28.7 | 25.4 | 25.4 |
| 3) D2a/fw | 0.20 | 0.19 | 0.19 | 0.18 |
| 4) Rn1 + Rn2/ Rn1 – Rn2 | 1.27 | 1.20 | 0.70 | 0.88 |
| 5) f2P/f2n | –0.79 | –0.79 | –0.86 | –0.89 |
| 6) d2abw/fw | 0.49 | 0.41 | 0.48 | 0.48 |
| 7) f1/fw | –1.73 | –1.82 | –1.92 | –2.15 |
| 8) f2b/fw | 3.27 | 4.20 | 4.37 | 5.58 |

According to the present embodiment described above, there can be realized a zoom lens in which the lens construction of each lens unit and the method of moving each lens unit during zooming are set appropriately to thereby achieve the curtailment of the number of lenses of the entire system and the shortening of the full length of the lens, and yet which has a variable power ratio of about 2 to 2.5 times and is bright and has high optical performance and which is suitable as the photo-taking optical system of a camera using an image pickup device such as a digital still camera or a video camera covering a wide angle area as a focal length change range.

An embodiment of a digital camera using the zoom lens according to the present embodiment as a photo-taking optical system will now be described with reference to FIG. 17.

Figure 17:
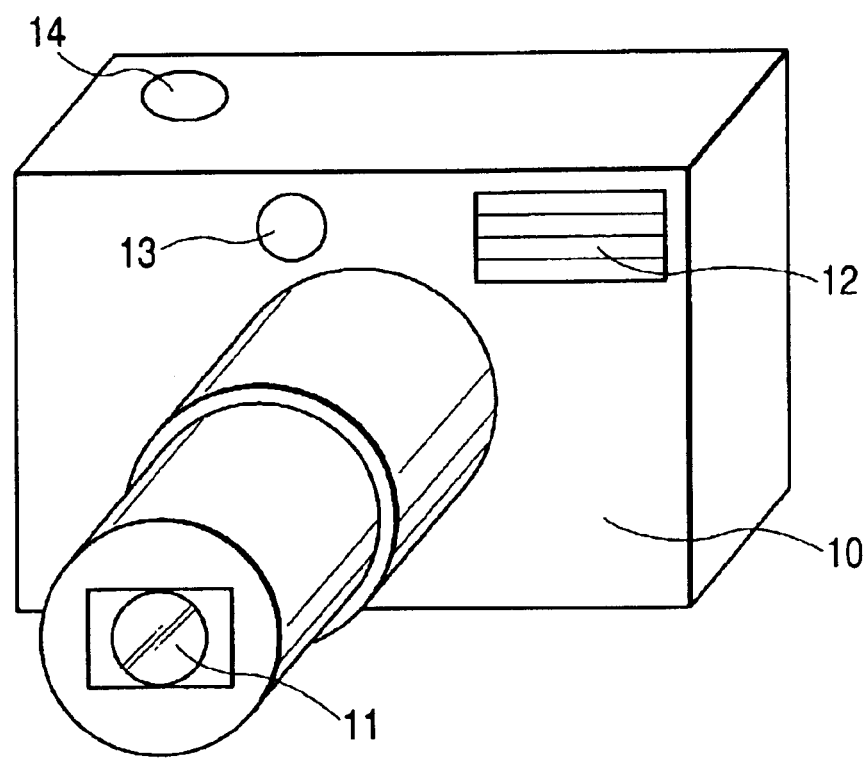
FIG. 17 is a schematic view of a digital camera.

In FIG. 17, the reference numeral 10 designates the main body of the camera, the reference numeral 11 denotes a photo-taking optical system constituted by the zoom lens according to the present embodiment, the reference numeral 12 designates a stroboscopic lamp contained in the main body of the camera, the reference numeral 13 denotes an external type finder, and the reference numeral 14 designates a shutter button. The image of an object formed by the photo-taking optical system is formed on the light receiving surface of a solid state image pickup device (not shown) such as a CCD or a CMOS. Object information photoelectrically converted by the solid state image pickup device is recorded as digital information.

By applying the zoom lens according to the present embodiment to an optical apparatus such as a digital camera, as described above, there is realized an optical apparatus which is compact and has high optical performance.

What is claimed is:

1. A zoom lens comprising, in order from the object side to the image side:
   a first lens unit of negative optical power; and
   a second lens unit of positive optical power having, in order from the object side to the image side, an aspherical positive lens and an aspherical negative lens;
   wherein said zoom lens effects zooming by varying the interval between the first lens unit and the second lens unit and said zoom lens satisfies the following conditions, $$0.15 < D2a/fw < 0.3$$

where D2$a$ is the on-axis distance from the image side surface of the aspherical positive lens in said second lens unit to the image side surface of said aspherical negative lens and fw is the focal length of the entire system at the wide angle end.

2. A zoom lens according to claim 1, wherein said zoom lens satisfies the following condition, $$1.75 < Nn < 1.95$$

where Nn is the refractive index of the material of the aspherical negative lens in said second lens unit.

3. A zoom lens according to claim 1, wherein said zoom lens satisfies the following condition, $$15 < vn - vp$$

where vn and vp are the Abbe numbers of the materials of the aspherical positive lens and the aspherical negative lens in said second lens unit, respectively.

4. A zoom lens according to claim 1, wherein the aspherical negative lens in said second lens unit is of a meniscus or biconcave shape which is greater in the absolute value of the optical power of the image side surface thereof as compared with the object side thereof.

5. A zoom lens according to claim 1, wherein said zoom lens satisfies the following condition, $$0.5 < (Rn1 + Rn2)/(Rn1 - Rn2) < 1.8$$

where Rn1 and Rn2 are the radii of curvature of the object side and image side surfaces of the aspherical negative lens in said second lens unit, respectively.

6. A zoom lens according to claim 1, wherein said zoom lens satisfies the following condition, $$-1.0 < f2P/f2n < -0.6$$

where f2P is the focal length of the aspherical positive lens in said second lens unit and f2n is the focal length of the aspherical negative lens.

7. A zoom lens according to claim 1, which forms an image on a solid state image pickup device.

8. A zoom lens comprising, in order from the object side to the image side:
   a first lens unit of negative optical power; and
   a second lens unit of positive optical power consisting of a first lens subunit of positive optical power and a second lens subunit of positive optical power with the greatest interval in the unit as a boundary, the first lens subunit consisting, in order from the object side to the image side, of two single lenses which are an aspherical positive lens and an aspherical negative lens;
   wherein said zoom lens effects zooming by varying the interval between the first lens unit and the second lens unit, and
   wherein said zoom lens satisfies the following condition, $$0.2 < d2abw/fw < 1.0$$

where d2abw is the interval between said first lens subunit and said second lens subunit at the wide angle end when the zoom lens is focused on an infinity object and fw is the focal length of the entire system at the wide angle end.

9. A zoom lens according to claim 8, wherein said first lens unit consists, in order from the object side to the image side, of an aspherical negative lens of a shape greater in the absolute value of the refractive power of the image side surface thereof as compared with the object side thereof, and a meniscus-shaped positive lens having its convex surface facing the object side.

10. A zoom lens according to claim 8, wherein the interval between said first lens subunit and said second lens subunit is varied during zooming from the wide angle end to the telephoto end.

11. A zoom lens according to claim 8, wherein said second lens subunit is a lens component comprising a single lens or a cemented lens.

12. A zoom lens according to claim 8, having an aperture stop on the object side of said first lens subunit.

13. A zoom lens according to claim 8, wherein said zoom lens satisfies the following conditions, $$-2.5 < f1/fw < -1.5$$

$$2.5 < f2b/fw < 6.5$$

where f1 is the focal length of said first lens unit and f2b is the focal length of said second lens subunit.

14. A zoom lens according to claim 8, wherein said zoom lens satisfies the following conditions, $$0.1 < D2a/fw < 0.3$$

where D2$a$ is the on-axis distance from the image side surface of the aspherical positive lens in said second lens unit to the image side surface of the aspherical negative lens.

15. A zoom lens according to claim 8, wherein said zoom lens satisfies the following conditions, $$15 < vn - vp$$

where vn and vp are the Abbe numbers of the materials of the aspherical positive lens and the aspherical negative lens in said second lens unit, respectively.

16. A zoom lens according to claim 8, wherein said zoom lens satisfies the following conditions, $$1.75 < Nn < 1.95$$

where Nn is the refractive index of the material of the aspherical negative lens in said second lens unit.

17. A zoom lens according to claim 8, wherein said zoom lens satisfies the following conditions, $$0.5<(Rn1+Rn2)/(Rn1-Rn2)<1.8$$

where Rn1 and Rn2 are the radii of curvature of the object side and image side surfaces of the aspherical negative lens in said second lens unit, respectively.

18. A zoom lens according to claim 8, wherein said zoom lens satisfies the following conditions, $$-1.0<f2P/f2n<-0.6$$

where f2P and f2n are the focal lengths of the aspherical positive lens and the aspherical negative lens in said second lens unit.

19. A zoom lens according to claim 8, further comprising:
a third lens unit of positive optical power disposed on the image side of said second lens unit; and
wherein said zoom lens effects zooming with the lens units moved so that relative to the wide angle end, the interval between said first lens unit and said second lens unit may become small and the interval between said second lens unit and said third lens unit may become great, at the telephoto end.

20. A zoom lens according to claim 19, wherein said third lens unit consists of a single lens greater in the absolute value of the optical power of the object side surface thereof as compared with the image side thereof.

21. A zoom lens according to claim 19, wherein said third lens unit is not moved for zooming.

22. A zoom lens according to claim 8, which forms an image on a solid state image pickup device.

23. A camera comprising:
a zoom lens according to claim 1; and
a solid state image pickup device for receiving an image formed by said zoom lens.

24. A camera comprising:
a zoom lens according to claim 8; and
a solid state image pickup device for receiving an image formed by said zoom lens.

25. A zoom lens comprising, in order from the object side to the image side:
a first lens unit of negative optical power, consisting of, in order from the object side to the image side, an aspherical negative lens and a spherical positive lens; and
a second lens unit of positive optical power having, in order from the object side to the image side, an aspherical positive lens and an aspherical negative lens;
wherein said zoom lens effects zooming by varying the interval between the first lens unit and the second lens unit, and
wherein the aspherical negative lens in said second lens unit is of a meniscus or biconcave shape which is great in the absolute value of the optical power of the image side surface thereof as compared with the object side thereof.

26. A zoom lens according to claim 25, which forms an image on a solid state image pickup device.

27. A camera provided with:
a zoom lens according to claim 25; and
a solid state image pickup device for receiving an image formed by said zoom lens.

28. A zoom lens comprising, in order from the object side to the image side;
a first lens unit of negative optical power; and
a second lens unit of positive optical power having, in order from the object side to the image side, a first lens subunit of positive optical power and a second lens subunit of positive power, said first lens subunit consisting, in order from the object side to the image side, of two single lenses which are an aspherical positive lens and an aspherical negative lens;
wherein said zoom lens effects zooming by varying the interval between the first lens unit and the second lens unit and said second lens subunit effects focusing by moving in the direction of the optical axis.

29. A zoom lens according to claim 28, which forms an image on a solid state image pickup device.

30. A camera comprising:
a zoom lens according to claim 28; and
a solid state image pickup device for receiving an image formed by said zoom lens.

31. A camera comprising:
a zoom lens according to claim 28; and
a solid state image pickup device for receiving an image formed by said zoom lens.

32. A zoom lens comprising, in order from the object side to the image side:
a first lens unit of negative optical power; and
a second lens unit of positive optical power consisting of a first lens subunit of positive optical power and a second lens subunit of positive optical power with the greatest interval in the unit as a boundary, the first lens subunit consisting, in order from the object side to the image side, an aspherical positive lens having an aspeherical surface on the object side and an aspherical negative lens having an aspherical surface on the image side;
wherein said zoom lens effects zooming by varying the interval between the first lens unit and the second lens unit, and
wherein said zoom lens satisfies the following conditions, $$0.2<d2\ abw/fw<1.0$$
$$0.1<D2a/fw<0.3$$

where d2abw is the interval between said first lens subunit and said second lens subunit at the wide angle end when the zoom lens is focused on an infinity object, D2a is the on-axis distance from the image side surface of the aspherical positive lens in said second lens unit to the image side surface of the aspherical negative lens and fw is the focal length of the entire system at the wide angle end.

33. A zoom lens according to claim 32, wherein said first lens unit consists, in order from the object side to the image side, of an aspherical negative lens of a shape greater in the absolute value of the refractive power of the image side surface thereof as compared with the object side thereof, and a meniscus-shaped positive lens having its convex surface facing the object side.

34. A zoom lens according to claim 32, wherein the interval between said first lens subunit and said second lens subunit is varied during zooming from the wide angle end to the telephoto end.

35. A zoom lens according to claim 32, wherein said second lens subunit is a lens component comprising a single lens or a cemented lens.

36. A zoom lens according to claim 32, having an aperture stop on the object side of said first lens subunit.

37. A zoom lens according to claim 32, wherein said zoom lens satisfies the following conditions, $$-2.5 < f1/fw < -1.5$$

$$2.5 < f2b/fw < 6.5$$

where f1 is the focal length of said first lens subunit and f2b is the focal length of said second lens subunit.

38. A zoom lens according to claim 32, wherein said zoom lens satisfies the following conditions, $$15 < vn - vp$$

where vn and vp are the Abbe numbers of the materials of the aspherical positive lens and the aspherical negative lens in said second lens unit, respectively.

39. A zoom lens according to claim 32, wherein said zoom lens satisfies the following conditions, $$1.75 < Nn < 1.95$$

where Nn is the refractive index of the material of the aspherical negative lens in said second lens unit.

40. A zoom lens according to claim 32, wherein said zoom lens satisfies the following conditions, $$0.5 < (Rn1 + Rn2)/(Rn1 - Rn2) < 1.8$$

where Rn1 and Rn2 are the radii of curvature of the object side and image side surfaces of the aspherical negative lens in said second lens unit, respectively.

41. A zoom lens according to claim 32, wherein said zoom lens satisfies the following conditions, $$<1.0 < f2P/f2n < -0.6$$

where f2P and f2n are the focal lengths of the aspherical positive lens and the aspherical negative lens in said second lens unit.

42. A zoom lens according to claim 32, further comprising:

a third lens unit of positive optical power disposed on the image side of said second lens unit; and wherein said zoom lens effects zooming with the lens units moved so that relative to the wide angle end, the interval between said first lens unit and said second lens unit may become small and the interval between said second lens unit and said third lens unit may become great, at the telephoto end.

43. A zoom lens according to claim 42, wherein said third lens unit consists of a single lens greater in the absolute value of the optical power of the object side surface thereof as compared with the image side thereof.

44. A zoom lens according to claim 42, wherein said third lens unit is not moved for zooming.

45. A zoom lens according to claim 32, which forms an image on a solid state image pickup device.

46. A camera comprising:

a zoom lens according to claim 32; and a solid state image pickup device for receiving an image formed by said zoom lens.

* * * * *